US012074535B2

(12) United States Patent
Uda et al.

(10) Patent No.: US 12,074,535 B2
(45) Date of Patent: Aug. 27, 2024

(54) CONTROL DEVICE AND POWER CONVERSION DEVICE

(71) Applicant: Mitsubishi Electric Corporation, Tokyo (JP)

(72) Inventors: Ryosuke Uda, Tokyo (JP); Takeshi Kikuchi, Tokyo (JP); Shuhei Fujiwara, Tokyo (JP); Yoshiyuki Kono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 119 days.

(21) Appl. No.: 17/439,574

(22) PCT Filed: Apr. 25, 2019

(86) PCT No.: PCT/JP2019/017771
§ 371 (c)(1),
(2) Date: Sep. 15, 2021

(87) PCT Pub. No.: WO2020/217428
PCT Pub. Date: Oct. 29, 2020

(65) Prior Publication Data
US 2022/0158568 A1 May 19, 2022

(51) Int. Cl.
*H02M 7/483* (2007.01)
*H02J 3/36* (2006.01)
(Continued)

(52) U.S. Cl.
CPC ............ *H02M 7/4835* (2021.05); *H02J 3/36* (2013.01); *H02J 3/388* (2020.01); *H02M 1/0025* (2021.05); *H02M 7/79* (2013.01)

(58) Field of Classification Search
CPC .......... H02M 7/48; H02M 7/53; H02M 7/539; H02M 7/44; H02M 7/797; H02M 7/49;
(Continued)

(56) References Cited

U.S. PATENT DOCUMENTS 5,798,633 A * 8/1998 Larsen ...................... H02J 3/38
323/207
6,111,764 A * 8/2000 Atou ...................... H02J 9/062
307/66
(Continued)

FOREIGN PATENT DOCUMENTS

EP 3116087 A1 1/2017
JP 3547355 B2 7/2004
(Continued)

OTHER PUBLICATIONS

Extended European Search Report dated Mar. 10, 2022, issued in corresponding European Patent Application No. 19925967.2, 7 pages.
(Continued)

*Primary Examiner* — Gustavo A Rosario-Benitez
(74) *Attorney, Agent, or Firm* — Buchanan Ingersoll & Rooney PC

(57) ABSTRACT

A control device includes: a phase generation unit to generate a phase of a voltage command for the power converter; a voltage control unit to generate a voltage value of the voltage command; and a command unit to output the voltage command having the phase and the voltage value to the power converter. The voltage control unit includes: a voltage compensator unit to compute a compensation voltage value, based on a voltage deviation of a point-of-interconnection voltage from a reference voltage; a droop calculator unit to compute a first droop value in accordance with a magnitude of a point-of-interconnection current, when the AC power system is an isolated system, the isolated system being the AC power system not connected to a generator; and a calculation unit to calculate the voltage value of the voltage command, based on a difference between the compensation voltage value and the first droop value.

16 Claims, 25 Drawing Sheets

(51) Int. Cl.
*H02J 3/38* (2006.01)
*H02M 1/00* (2007.01)
*H02M 7/79* (2006.01)

(58) Field of Classification Search
CPC ........ H02M 7/79; H02M 7/4835; H02M 7/66; H02J 3/388; H02J 3/38; H02J 3/381; H02J 13/006; H02J 3/46; H02J 3/385–387
See application file for complete search history.

(56) References Cited

U.S. PATENT DOCUMENTS

| | | | | |
|---|---|---|---|---|
| 9,112,436 | B2 * | 8/2015 | Fujii | H02P 6/10 |
| 10,063,176 | B2 * | 8/2018 | Brogan | H02J 3/381 |
| 10,374,429 | B2 * | 8/2019 | Somani | H02J 3/381 |
| 2001/0005321 | A1 * | 6/2001 | Ichinose | H02J 3/32 363/95 |
| 2009/0279328 | A1 * | 11/2009 | Jiang-Hafner | H02M 7/797 363/35 |
| 2010/0302825 | A1 * | 12/2010 | Ohshima | H02M 7/53871 363/131 |
| 2012/0173035 | A1 | 7/2012 | Abe | |
| 2015/0357820 | A1 * | 12/2015 | Sugimoto | H02M 7/04 307/52 |
| 2016/0006338 | A1 * | 1/2016 | Sakimoto | H02P 9/105 363/131 |
| 2017/0047861 | A1 * | 2/2017 | Sakimoto | H02M 7/53871 |
| 2018/0069488 | A1 * | 3/2018 | Mukunoki | H02M 7/48 |
| 2019/0334352 | A1 * | 10/2019 | Sugimoto | H02J 3/48 |
| 2021/0194383 | A1 * | 6/2021 | Tsuruma | H02J 3/38 |

FOREIGN PATENT DOCUMENTS

| | | | |
|---|---|---|---|
| JP | 4287031 | B2 | 7/2009 |
| JP | 4673428 | B2 | 4/2011 |
| JP | 2012-161163 | A | 8/2012 |
| JP | 2013078207 | A | 4/2013 |
| JP | 2013138612 | A | 7/2013 |
| JP | 2015156772 | A | 8/2015 |
| JP | 2018129963 | A | 8/2018 |
| WO | 2008000626 | A1 | 1/2008 |
| WO | 2018020666 | A1 | 2/2018 |

OTHER PUBLICATIONS

International Search Report (PCT/ISA/210) with translation and Written Opinion (PCT/ISA/237) mailed on Jul. 19, 2019, by the Japan Patent Office as the International Searching Authority for International Application No. PCT/JP2019/017771.

Communication pursuant to Article 94(3) EPC dated Mar. 18, 2024, issued in the corresponding European Patent Application No. 19925967. 2, 11 pages.

* cited by examiner

CONTROL DEVICE AND POWER CONVERSION DEVICE

TECHNICAL FIELD

The present disclosure relates to a control device for a power converter.

BACKGROUND ART

For high-voltage direct-current (DC) power transmission, a power converter is employed which converts an electric power from an alternating-current (AC) power system into a DC power, or converts a DC power into an AC power. For the power converter, a separately excited converter having a thyristor applied thereto is conventionally used. However, recently, a self-excited voltage-stiff converter is used. Various schemes of self-excited converters are present, such as transformer multiplexing, modular multilevel converters, etc. Unlike the separately excited converters, the self-excited converters is capable of generating an AC voltage on its own, and thus can supply an electric power to an AC power system having no generator connected thereto.

For example, Japanese Patent Laying-Open No. 2018-129963 (PTL 1) discloses a control device for a power converter. This control device includes: a first switching unit which sets an AC current command value to zero in response to an input of a black start command for causing the power converter to operate without a power supply for an AC power system; a second switching unit which sets, in response to the input of a black start command, a harmonic component extracted from an AC current measurement, the harmonic component being other than the fundamental wave, to the AC current measurement; and a third switching unit which sets a pre-set AC voltage command value to an AC voltage measurement, in response to the input of a black start command.

CITATION LIST

Patent Literature

PTL 1: Japanese Patent Laying-Open No. 2018-129963

SUMMARY OF INVENTION

Technical Problem

A power converter interconnected with an AC power system having a power supply (e.g., a generator) connected thereto has a different operational mode than a power converter interconnected with an AC power system not connected to a generator. The power converter is required to continue to operate in a stable manner even in the event of variations in load or the like at the AC power system not connected to a generator.

An object of a certain aspect of the present disclosure is to provide a control device that allows the power converter to continue to operate in a more stable manner when the power converter is interconnected with an AC power system not connected to a generator.

Solution to Problem

According to a certain embodiment, a control device for controlling a self-excited power converter connected to an alternating-current (AC) power system, is provided. The control device includes: a phase generation unit to generate a phase of a voltage command for the power converter; a voltage control unit to generate a voltage value of the voltage command; and a command unit to output the voltage command having the phase and the voltage value to the power converter. The voltage control unit includes: a voltage compensator unit to compute a compensation voltage value, based on a voltage deviation of a point-of-interconnection voltage at a point of interconnection between the AC power system and the power converter from a reference voltage; a droop calculator unit to compute a first droop value in accordance with a magnitude of a point-of-interconnection current flowing through the point of interconnection, when the AC power system is an isolated system, the isolated system being the AC power system not connected to a generator; and a calculation unit to calculate the voltage value of the voltage command, based on a difference between the compensation voltage value and the first droop value.

Advantageous Effects of Invention

According to the present disclosure, the power converter is allowed to continue to operate in a more stable manner when the power converter is interconnected with an AC power system not connected to a generator.

DESCRIPTION OF EMBODIMENTS

Hereinafter, an embodiment according to the present disclosure is described, with reference to the accompanying drawings. In the following description, like reference signs refer to like parts. Their names and functionalities are also the same. Thus, detailed description thereof will not be repeated.

<System Configuration>

Figure 1:
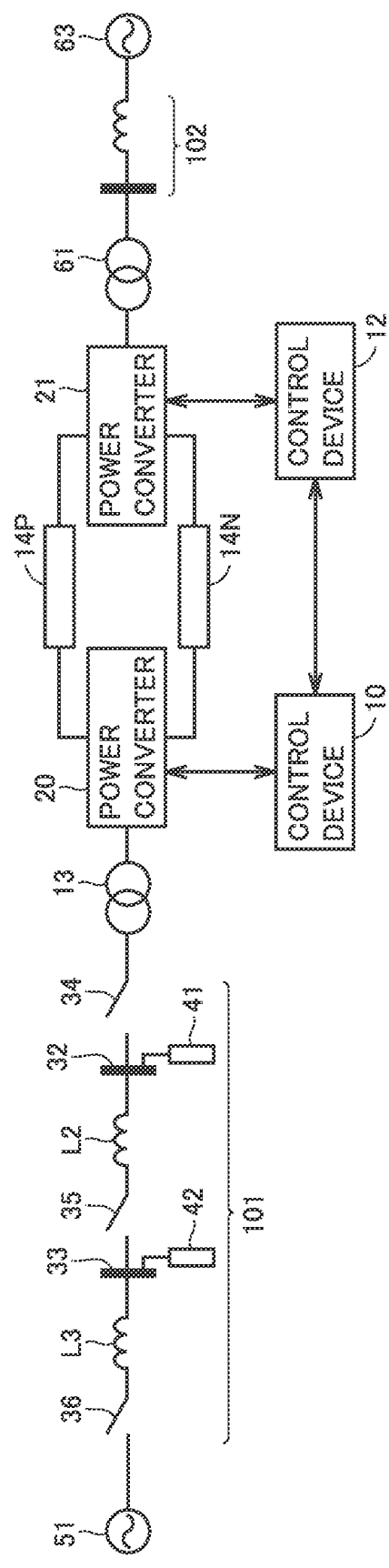
FIG. 1 is a diagram illustrating one example configuration of a power control system.

FIG. 1 is a diagram illustrating one example configuration of a power control system. For example, the power control system is a system for controlling an electric power of a direct-current (DC) power transmission system, as shown in FIG. 1. An electric power is transmitted and received between two alternating-current (AC) power systems 101 and 102 via a DC transmission line 14P on the positive side and a DC transmission line 14N on the negative side, DC transmission line 14P and DC transmission line 14N being DC power systems. Typically, AC power systems 101 and 102 are three-phase AC power systems.

AC power system 101 is connected to a power converter 20 via a transformer 13. AC power system 101 is also connected to a generator 51 via a breaker 36. AC power system 101 includes busbars 32 and 33, a load 41, a load 42, and breakers 34, 35, and 36. L2 indicates a system impedance between busbar 32 and busbar 33, and L3 indicates a system impedance between busbar 33 and generator 51.

Busbar 32 is a point of interconnection between AC power system 101 and power converter 20. Busbar 32 is connected to load 41. Busbar 33 is connected to load 42. Breaker 35 is disposed between busbar 32 and busbar 33. Breaker 36 is disposed between busbar 33 and generator 51. When breaker 36 is closed, generator 51 is connected to AC power system 101. When breaker 36 is open, generator 51 is not connected from AC power system 101.

Power converter 20 is connected between AC power system 101 and DC transmission lines 14P and 14N (hereinafter, also collectively referred to as a "DC transmission line 14"). AC power system 102 is connected to a generator 63, and is also connected to a power converter 21 via a transformer 61. Power converter 21 converts power between AC power system 102 and DC transmission line 14.

For example, a power is transmitted from AC power system 102 to AC power system 101. In this case, power converter 20 operates as a rectifier (REC), and power converter 21 operates as an inverter (INV). Specifically, AC power is converted to DC power by power converter 21, and the DC power is dc transmitted via DC transmission line 14. The DC power is converted to AC power by power converter 20 at the receiving end, and the AC power is supplied to AC power system 101 via transformer 13. Note that the opposite conversion operation from the above is performed when power converter 21 operates as an inverter and power converter 20 operates as a rectifier.

Power converter 20 is configured of a self-excited, voltage-type power converter. For example, power converter 20 is configured of a modular multilevel converter which includes multiple sub-modules connected in series. The "sub-module" is also referred to as a "converter cell." Note that power converter 21 is also configured of a self-excited, voltage-type power converter.

A control device 10 obtains electrical quantities (e.g., current, voltage, etc.), for use in control of power converter 20, from multiple detectors. Based on the electrical quantities obtained from the multiple detectors, control device 10 controls operation of power converter 20. Control device 10 is communicable with a control device 12. Control device 12 controls an operation of power converter 21, based on electrical quantities obtained from multiple detectors. Control device 12 has the same configuration as control device 10.

In the present embodiment, since power converter 20 is a self-excited power converter, AC power system 101 can be recovered from the power outage state by causing power converter 20 to operate as a power source (i.e., a voltage source) of AC power system 101 and supplying AC power system 101 with power from power converter 20.

Specifically, power converter 20 has black start capability of recovering AC power system 101 from the power outage state even in the event the breaker 36 is open and AC power system 101 is not connected from generator 51. Note that it is assumed that various backup powers (e.g., a power source for the control device, an auxiliary power source, etc.) are ensured, which enable power converter 20 to operate even when AC power system 101 is in the power outage state. Alternatively, when AC power system 101 is interrupted, power converter 20 may be operated with supply of power from generator 63 via DC transmission line 14.

For example, control device 10 controls power converter 20, thereby launching AC power system 101 in the following procedure. Assume that breakers 34 to 36 are open in the initial state. Initially, power converter 20 is started up with supply of an electric power through DC transmission line 14.

Subsequently, breaker 34 is closed, which connects power converter 20 to busbar 32 which is the point of interconnection between power converter 20 and AC power system 101. At this time, power converter 20 is interconnected with AC power system 101 that is not connected to generator 51. Herein, AC power system 101 being not connected to generator 51 is also referred to as an "isolated system." In this case, control device 10 causes power converter 20 to operate in a constant-voltage constant-frequency (CVCF) control scheme, thereby causing power converter 20 to function as a voltage source of AC power system 101.

Breaker 35 and breaker 36 are thereafter closed in the listed order. As breaker 36 is closed, generator 51 is connected to AC power system 101, at which time the power converter 20 is interconnected with AC power system 101 connected to generator 51. Herein, AC power system 101 being connected to generator 51 is also referred to as an "interconnected system."

Generator 51 has a frequency droop control capability of reducing the generator output (i.e., effective power output of the generator) as the frequency of the generator increases, and increasing the effective power output as the frequency decreases, in accordance with a predetermined slope (i.e., a regulation rate). Therefore, as power converter 20 is interconnected to AC power system 101 connected to generator 51, control device 10 switches the control scheme for power converter 20 to other control scheme (e.g., a frequency droop control scheme) different from the CVCF control scheme. The frequency of AC power system 101 is maintained constant by power converter 20 and generator 51, which is connected to AC power system 101, coordinating together.

<Configuration of Power Converter>

Figure 2:
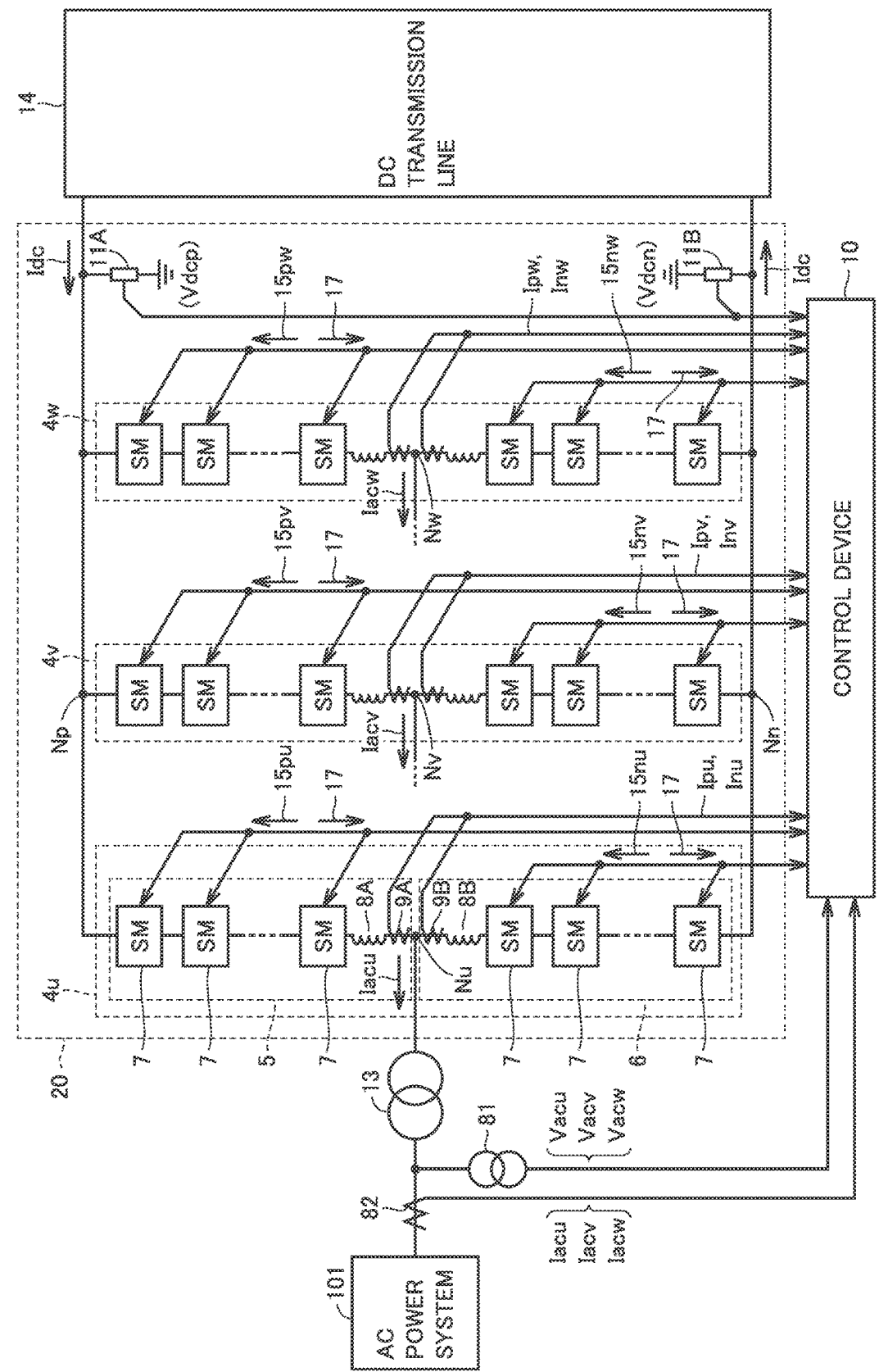
FIG. 2 is a schematic configuration diagram of a power converter.

(Overall Configuration) FIG. 2 is a schematic configuration diagram of power converter 20. Referring to FIG. 2, power converter 20 includes multiple leg circuits 4u, 4v, and 4w (hereinafter, also collectively referred to as a "leg circuit 4") which are connected in parallel between a positive DC terminal (i.e., a high-potential-side DC terminal) Np and a negative DC terminal (i.e., a low-potential-side DC terminal) Nn. Leg circuit 4 is provided for each of the AC phases. Leg circuit 4 converts an electric power between AC power system 101 and DC transmission line 14. In FIG. 2, three leg circuits 4u, 4v, and 4w are provided, respectively, corresponding to U-phase, V-phase, and W-phase of AC power system 101.

Leg circuits 4u, 4v, and 4w have AC input terminals Nu, Nv, and Nw, respectively, which are connected to transformer 13. In FIG. 1, for ease of illustration, the connections between AC input terminals Nv, Nw and transformer 13 are not shown. The high-potential-side DC terminal Np and the low-potential-side DC terminal Nn, which are commonly connected each leg circuit 4, are connected to DC transmission line 14.

Instead of transformer 13 of FIG. 1, an interconnection reactor may be used. Furthermore, instead of AC input terminals Nu, Nv, and Nw, the primary winding may be provided for each of leg circuits 4u, 4v, 4w, and leg circuits 4u, 4v, and 4w may be connected to transformer 13 or the interconnection reactor in an AC manner via the secondary winding magnetically coupled to the primary winding. In this case, the primary winding may be reactors 8A, 8B described below. In other words, leg circuit 4 is electrically (i.e., a DC manner or an AC manner) connected to AC power system 101 via connectors, such as AC input terminals Nu, Nv, Nw or the above primary winding, provided for respective leg circuits 4u, 4v, 4w.

Leg circuit 4u includes an upper arm 5 and a lower arm 6, the upper arm 5 extending from high-potential-side DC terminal Np to AC input terminal Nu, the lower arm 6 extending from low-potential-side DC terminal Nn to AC input terminal Nu. AC input terminal Nu, which is the point of connection between upper arm 5 and lower arm 6, is connected to transformer 13. High-potential-side DC terminal Np and low-potential-side DC terminal Nn are connected to DC transmission line 14. Leg circuits 4v, 4w have the same configuration as leg circuit 4u. Thus, leg circuit 4u will thus be representatively described below.

Upper arm 5 includes multiple cascade-connected sub-modules 7 and a reactor 8A. Multiple sub-modules 7 and reactor 8A are connected in series. Similarly, lower arm 6 includes multiple cascade-connected sub-modules 7 and reactor 8B. Multiple sub-modules 7 and reactor 8B are connected in series.

The location where reactor 8A is placed may be anywhere in upper arm 5 of leg circuit 4u, and the location where reactor 8B is placed may be anywhere in lower arm 6 of leg circuit 4u. Multiple reactors 8A and multiple reactors 8B may be placed. The reactors may have different inductance values. Furthermore, only reactor 8A of upper arm 5 may be provided, or only reactor 8B of lower arm 6 may be provided.

Reactors 8A and 8B are provided to prevent a rapid increase of a fault current in the event of a fault of AC power system 101 or DC transmission line 14, for example. However, reactors 8A, 8B having excessive inductance values result in reduced efficiency of the power converter. Accordingly, preferably, all the switching elements of each sub-module 7 are stopped (turned off) as soon as possible in the event of a fault.

Power converter 20 further includes an AC voltage detector 81, an AC current detector 82, DC voltage detectors 11A, 11B, and arm current detectors 9A, 9B as detectors for measuring the electrical quantities (e.g., current, voltage, etc.) for use in the control of power converter 20. Arm current detectors 9A, 9B are provided for each leg circuit 4.

Signals detected by these detectors are input to control device 10. Based on the detection signals, control device 10 outputs control commands 15pu, 15nu, 15pv, 15nv, 15pw, 15nw for controlling the operating state of each sub-module 7. Control device 10 also receives a signal 17 from each sub-module 7. Signal 17 contains a detection value of a voltage of a DC capacitor 24 of FIG. 3 described below.

Control commands 15pu, 15nu, 15pv, 15nv, 15pw, 15nw (hereinafter, also collectively referred to as a "control command 15") are generated respectively corresponding to the U-phase upper arm, the U-phase lower arm, the V-phase upper arm, the V-phase lower arm, the W-phase upper arm, and the W-phase lower arm.

Note that, for ease of illustration, in FIG. 1, some of signal lines for the signals input from the detectors to control device 10, and signal lines for the signals input and output between control device 10 and sub-modules 7 are collectively depicted, but they are, in practice, provided for each detector and each sub-module 7. Signal lines may be provided separately for transmission and receipt of the signal between each sub-module 7 and control device 10. In the present embodiment, from the standpoint of noise tolerance, these signals are transmitted via optical fibers.

In the following, each detector is described in detail. AC voltage detector 81 detects U-phase AC voltage value Vacu, V-phase AC voltage value Vacv, and W-phase AC voltage value Vacw of busbar 32 which is the point of interconnection between power converter 20 and AC power system 101. In the following description, AC voltage values Vacu, Vacv, and Vacw of the three phases are also collectively referred to as a point-of-interconnection voltage Vs.

AC current detector 82 detects a U-phase AC current value Iacu, a V-phase AC current value Iacv, and a W-phase AC current value Iacw flowing through the point of interconnection. In the following description, the AC current values Iacu, Iacv, and Iacw of the three phases are also collectively referred to as a point-of-interconnection current Is. DC voltage detector 11A detects a DC voltage value Vdcp of high-potential-side DC terminal Np connected to DC transmission line 14. DC voltage detector 11B detects a DC voltage value Vdcn of low-potential-side DC terminal Nn connected to DC transmission line 14.

Arm current detectors 9A and 9B, included in leg circuit 4u for U phase, detect an upper-arm current Ipu flowing through upper arm 5 and a lower-arm current Inu flowing through lower arm 6, respectively. Similarly, arm current detectors 9A and 9B, included in leg circuit 4v for V phase, detect an upper arm current Ipv and a lower arm current Inv, respectively. Arm current detectors 9A and 9B, included in leg circuit 4w for W phase, detect an upper arm current Ipw and a lower arm current Inw, respectively.

(Configuration Example of Sub-Module)

Figure 3:
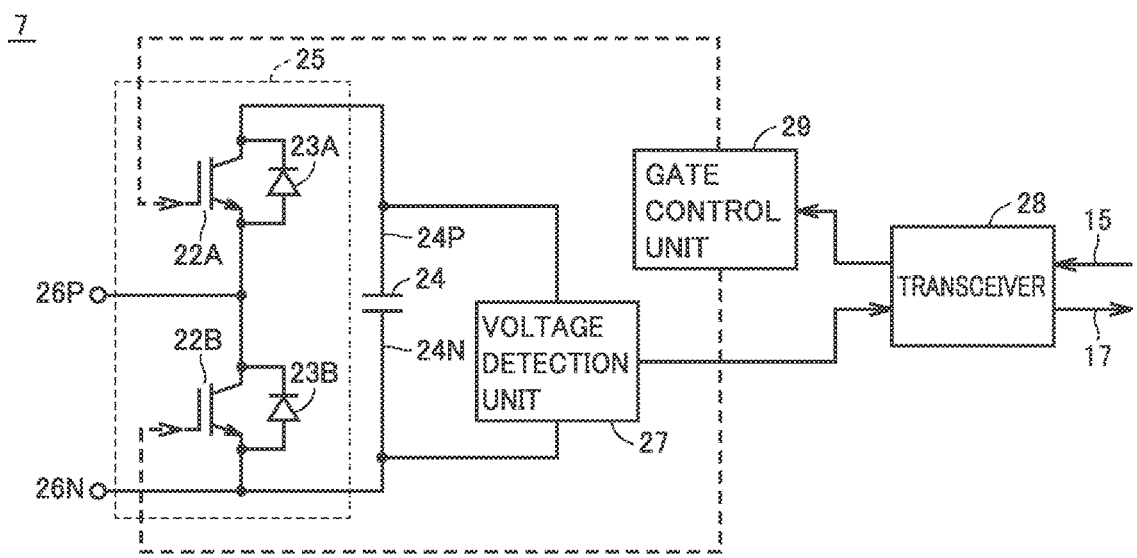
FIG. 3 is a circuit diagram showing one example of a sub-module included in each leg circuit of FIG. 2.

FIG. 3 is a circuit diagram showing one example of the sub-module included in each leg circuit of FIG. 2. Sub-module 7 shown in FIG. 3 includes a half-bridge converter circuit 25, a DC capacitor 24 as an energy storage, a DC voltage detection unit 27, a transceiver 28, and a gate control unit 29.

Half-bridge converter circuit 25 includes switching elements 22A, 22B connected in series, and diodes 23A, 23B. Diodes 23A, 23B are connected in anti-parallel (i.e., in parallel and in the reverse bias direction) with switching elements 22A, 22B, respectively. DC capacitor 24 is connected in parallel with series connected circuits of switching elements 22A, 22B, and holds a DC voltage. A connection node between switching elements 22A, 22B is connected to a high-potential-side input-output terminal 26P. A connection node between switching element 22B and DC capacitor 24 is connected to a low-potential-side input-output terminal 26N.

Gate control unit 29 receives control command 15 from control device 10, and operates in accordance with the control command 15. In normal operation (i.e., when gate control unit 29 outputs a zero voltage or a positive voltage between input-output terminals 26P and 26N), gate control unit 29 controls switching elements 22A and 22B so that one of switching elements 22A and 22B is on and the other one of switching elements 22A and 22B is off. When switching element 22A is on and switching element 22B is off, a voltage across DC capacitor 24 is applied between input-output terminals 26P and 26N. Conversely, when switching element 22A is off and switching element 22B is on, the voltage between input-output terminals 26P and 26N is 0 V.

Accordingly, sub-module 7 shown in FIG. 3 alternately turns on switching elements 22A and 22B, thereby outputting a zero voltage or a positive voltage that is dependent on the voltage of DC capacitor 24.

In contrast, control device 10 transmits a gate block (i.e., a switching element turning off) command to transceiver 28 if detected that the arm current is overcurrent. As gate control unit 29 receives the gate block command via transceiver 28, gate control unit 29 turns off switching elements 22A, 22B to protect the circuit. As a result, switching elements 22A, 22B can be protected in the event of a ground fault of AC power system 101, for example.

DC voltage detection unit 27 detects a voltage between the opposing ends 24P and 24N of DC capacitor 24. Transceiver 28 conveys control command 15, received from control device 10, to gate control unit 29, and transmits to control device 10 signal 17 representing the voltage of DC capacitor 24 detected by DC voltage detection unit 27.

The above DC voltage detection unit 27, transceiver 28, and gate control unit 29 may each be configured by a dedicated circuit, or configured using a FPGA (Field Programmable Gate Array), for example. A self-arc-extinguishing switching element that is capable of controlling the on operation and off operation thereof is used for each of switching elements 22A, 22B. Switching elements 22A, 22B are, for example, IGBTs (Insulated Gate Bipolar Transistor) or GCTs (Gate Commutated Turn-off thyristor).

The configuration of sub-module 7 described above is by way of example, and sub-module 7 that has other configuration may be applied to the present embodiment. For example, sub-module 7 may be configured using a full-bridge converter circuit or a three-quarter-bridge converter circuit. The three-quarter-bridge converter circuit is also called a semi-full-bridge converter circuit, which is a full-bridge converter circuit having removed therefrom one on/off switching semiconductor.

<Hardware Configuration of Control Device>

Figure 4:
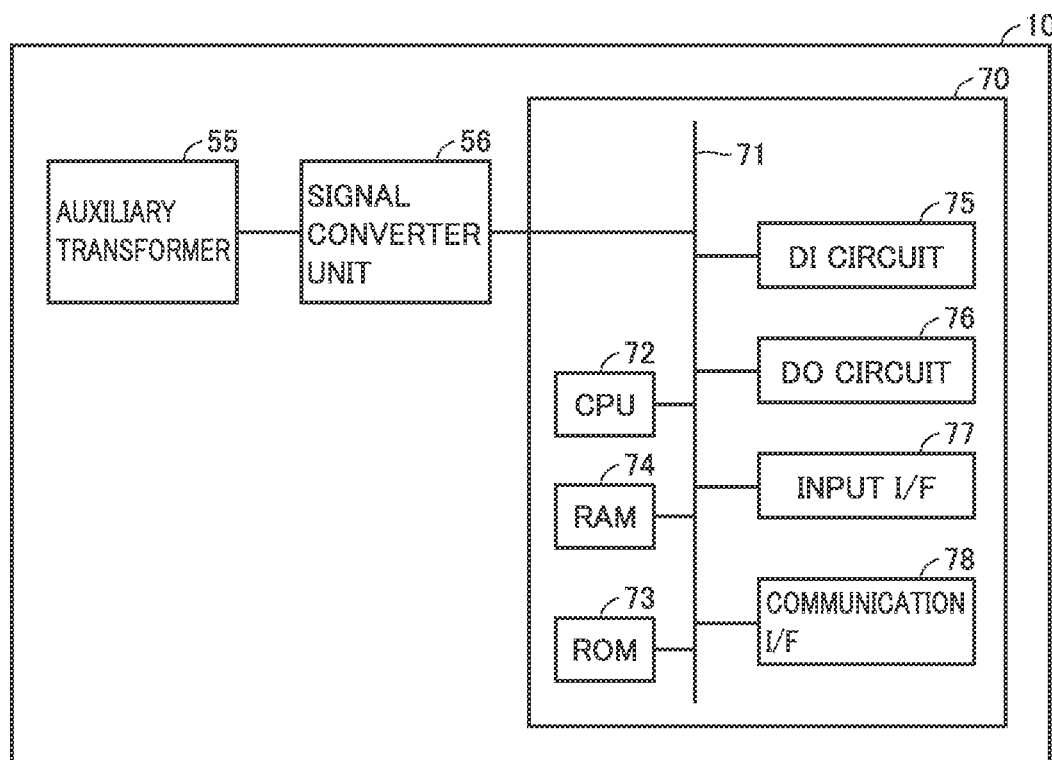
FIG. 4 is a diagram illustrating one example hardware configuration of a control device.

FIG. 4 is a diagram illustrating one example hardware configuration of control device 10. Referring to FIG. 4, control device 10 includes an auxiliary transformer 55, a signal converter unit 56, and an arithmetic processing unit 70. For example, control device 10 is configured as a digital protection and control device.

Auxiliary transformer 55 takes in and converts the electrical quantity from each detector to a voltage signal suitable for signal processing by an internal circuit, and outputs the voltage signal. Signal converter unit 56 takes in and converts an analog signal (i.e., the voltage signal) output from auxiliary transformer 55 to a digital signal. Specifically, signal converter unit 56 includes an analog filter, a sample and hold circuit, a multiplexer, and an AD converter.

The analog filter removes a high-frequency noise component from the voltage signal output from auxiliary transformer 55. The sample and hold circuit samples the signal output from the analog filter in predetermined sampling cycles. The multiplexer sequentially switches the waveform signals, input from the sample and hold circuit, on a time-series basis, based on a timing signal input from arithmetic processing unit 70, and inputs the waveform signal to the AD converter. The AD converter converts the waveform signal, input from the multiplexer, from analog data to digital data. The AD converter outputs the waveform signal (digital data) having through the digital conversion, to arithmetic processing unit 70.

Arithmetic processing unit 70 includes a central processing unit (CPU) 72, a ROM 73, a RAM 74, a digital input (DI) circuit 75, a digital output (DO) circuit 76, an input interface (I/F) 77, and a communication interface (I/F) 78, which are coupled together by a bus 71.

CPU 72 reads and executes programs pre-stored in ROM 73, thereby controlling the operation of control device 10. Note that ROM 73 is storing various pieces of information that are used by CPU 72. CPU 72 is, for example, a microprocessor. Note that the hardware may be other than a CPU, such as an FPGA, application specific integrated circuit (ASIC), and any other circuit that has arithmetic functions.

CPU 72 takes in the digital data from signal converter unit 56 via bus 71. Using the digital data, CPU 72 performs a control operation, according to a program stored in ROM 73.

Based on a result of the control operation, CPU 72 externally outputs a control command. CPU 72 also receives a response to the control command via DI circuit 75. Input interface 77 is, typically, various buttons or the like, and receives configuration actions from a system operator. CPU 72 also transmits/receives various pieces of information to/from other device via communication interface 78.

<Scheme for Determination as to Shifting to Isolated System>

Figure 5:
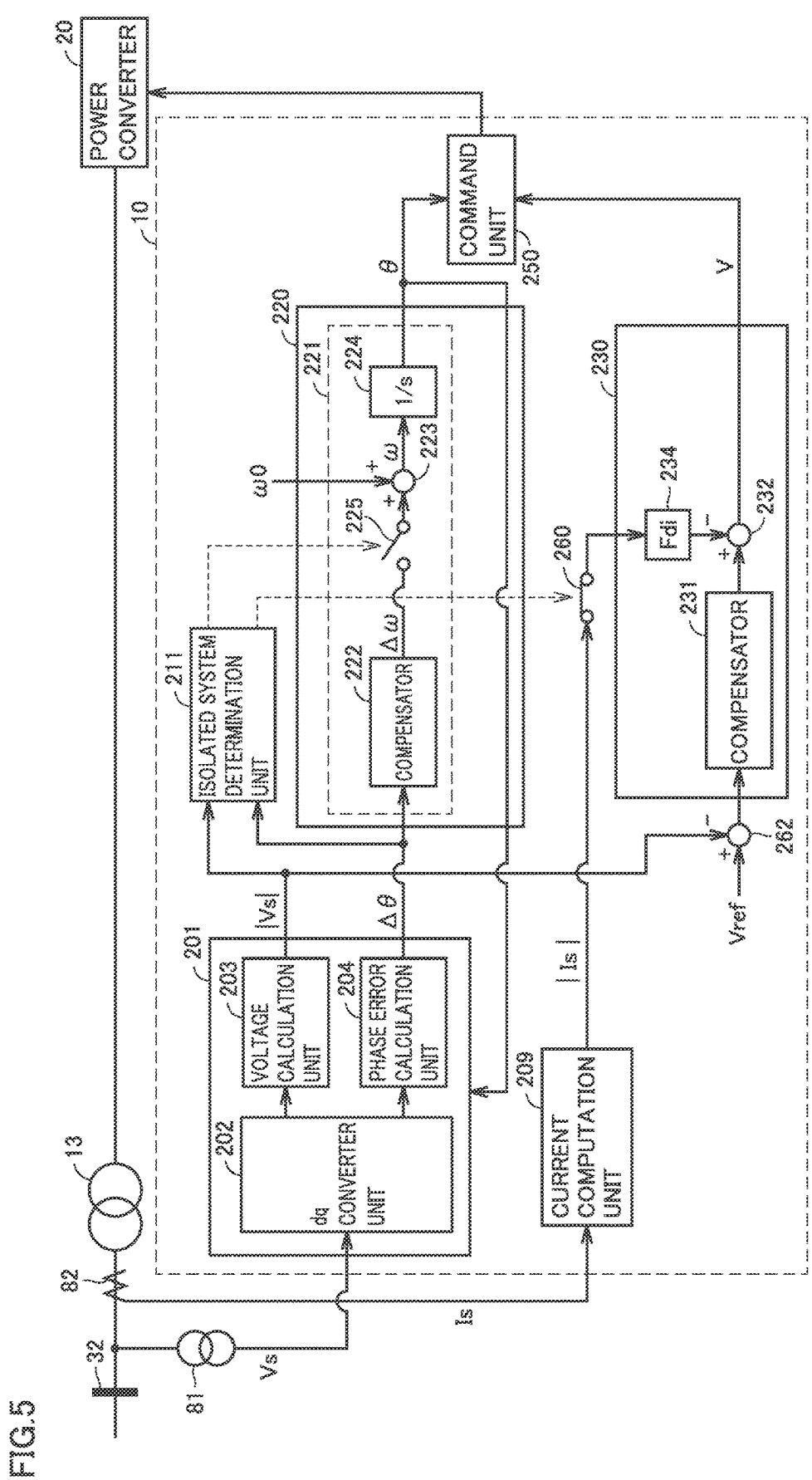
FIG. 5 is a diagram illustrating one example functional configuration of the control device.
Figure 6:
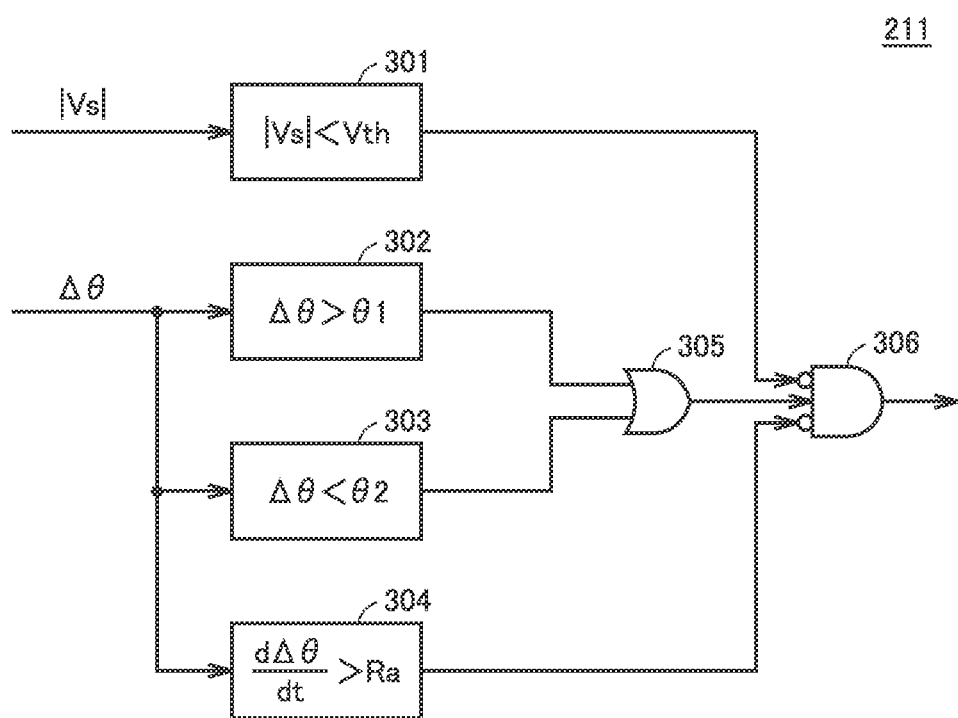
FIG. 6 is a diagram for illustrating a configuration of an isolated system determination unit.

Referring to FIGS. 5 and 6, a determination scheme is now described, for determining whether AC power system 101, connected to power converter 20, has shifted from the interconnected system to the isolated system.

FIG. 5 is a diagram illustrating one example functional configuration of control device 10. Referring to FIG. 5, control device 10 includes a voltage computation unit 201, a current computation unit 209, an isolated system determination unit 211, a frequency control unit 220, a voltage control unit 230, and a command unit 250. The functions of these components are implemented by CPU 72, included in arithmetic processing unit 70, executing programs stored in ROM 73, for example. Note that some or all the functions of these components may be configured to be implemented in hardware.

Voltage computation unit 201 obtains a three-phase point-of-interconnection voltage Vs detected by AC voltage detector 81, and calculates a voltage absolute value |Vs| indicative of the magnitude of point-of-interconnection voltage Vs, and a phase error $\Delta\theta$. Specifically, voltage computation unit 201 includes a dq converter unit 202, a voltage calculation unit 203, and a phase error calculation unit 204.

The dq converter unit 202 performs d-q transformation on point-of-interconnection voltage Vs, using a phase $\theta$ of a voltage command for power converter 20, to calculate Vd0, which is the d-axis component of the point-of-interconnection voltage, and Vq0, which is the q-axis component of the point-of-interconnection voltage. The dq converter unit 202 applies a low-pass filter to d-axis component Vd0 and q-axis component Vq0 to remove the harmonic component therefrom, to calculate a d-axis component Vd and a q-axis component Vq having the harmonic component removed therefrom. Note that phase $\theta$ is generated by frequency control unit 220 described below.

Voltage calculation unit 203 performs polar transformation on d-axis component Vd and q-axis component Vq to calculate an amplitude component. Specifically, voltage calculation unit 203 calculates voltage absolute value |Vs|, which indicates the magnitude of point-of-interconnection voltage Vs. Typically, voltage absolute value |Is| is the amplitude value or the effective value of point-of-interconnection voltage Vs.

Phase error calculation unit 204 performs polar transformation on d-axis component Vd and q-axis component Vq to calculate a phase component. The phase component corresponds to phase error $\Delta\theta$, which is a phase difference between phase $\theta$ of the voltage command for power converter 20 and the phase of point-of-interconnection voltage Vs. This is because dq converter unit 202 performs d-q transformation on point-of-interconnection voltage Vs, using phase $\theta$ of the voltage command for power converter 20.

Current computation unit 209 obtains a three-phase point-of-interconnection current Is detected by AC current detector 82 to calculate a current absolute value |Is|, which indicates the magnitude of point-of-interconnection current Is. Typically, current absolute value |Vs| is the amplitude value or the effective value of point-of-interconnection current Is.

Frequency control unit 220 includes a phase generation unit 221. Phase generation unit 221 generates phase $\theta$ of a voltage command for power converter 20, and outputs phase $\theta$ to command unit 250 and voltage computation unit 201. Phase generation unit 221 includes a compensator 222, an adder 223, a time integrator 224, and a switch 225.

Compensator 222 receives input of phase error $\Delta\theta$, computes and outputs a compensating angular frequency $\Delta\omega$ compensating for phase error $\Delta\theta$. Specifically, compensating angular frequency $\Delta\omega$ is an angular frequency for nulling out the phase error $\Delta\theta$. For example, compensator 222 is configured of a feedback controller, such as a proportional-integral controller (PI controller).

When AC power system 101 is the interconnected system, switch 225 is controlled to an ON state. When AC power system 101 is the isolated system, switch 225 is controlled to an OFF state.

When AC power system 101 is the interconnected system and switch 225 is controlled to an ON state, frequency control unit 220 generates phase $\theta$ under a control scheme in an interconnected system mode. Specifically, adder 223, included in phase generation unit 221, adds a reference angular frequency $\omega 0$ and compensating angular frequency $\Delta\omega$ for power converter 20, and outputs the sum, that is, an angular frequency $\omega$ to time integrator 224. Time integrator 224 time-integrates angular frequency $\omega$, thereby calculating phase $\theta$ of the voltage command for power converter 20, and outputs phase $\theta$ to command unit 250. Since phase $\theta$ is an angle, a multiple of 360 degrees may be added/subtracted to/from phase $\theta$ so that phase $\theta$ falls within plus or minus 180. Note that details of the operation of frequency control unit 220 when switch 225 is controlled to an OFF state, will be described below.

A switch 260 is controlled to an OFF state when AC power system 101 is the interconnected system, and controlled to an ON state when AC power system 101 is the isolated system.

An adder-subtractor 262 calculates a voltage deviation $\Delta Vr$ of voltage absolute value |Vs| from a reference voltage value Vref. A deviation $\Delta V$, which is output from adder-subtractor 262, is input to voltage control unit 230.

Voltage control unit 230 generates a voltage value V of the voltage command. Specifically, voltage control unit 230 includes a compensator 231, an adder-subtractor 232, and a droop calculator 234 (corresponding to "Fdi" in FIG. 5).

When AC power system 101 is the interconnected system and switch 260 is controlled to an OFF state, voltage control unit 230 generates voltage value V under a control scheme in the interconnected system mode. Specifically, compensator 231 computes a compensation voltage value, based on voltage deviation $\Delta Vr$. Specifically, the compensation voltage value is a voltage value for nulling out the voltage deviation $\Delta Vr$. Since current absolute value |Is| is not input to droop calculator 234, droop calculator 234 does not output a droop value as a function of current absolute value |Is|. Accordingly, adder-subtractor 232 outputs the compensation voltage value to command unit 250, as voltage value V of the voltage command. Note that details of the operation of voltage control unit 230 when switch 260 is controlled to an ON state, will be described below.

Command unit 250 generates a voltage command that has phase $\theta$ generated by frequency control unit 220 and voltage value V generated by voltage control unit 230, and outputs the voltage command to power converter 20, as a control command. When AC power system 101 is the interconnected system, power converter 20 is capable of generating a voltage that is synchronized with the interconnected system.

Here, assume that generator 51 is detached from AC power system 101 due to an accident or the like, and AC power system 101 is shifted from the interconnected system to the isolated system. In the present embodiment, isolated system determination unit 211 detects that AC power system 101 has shifted from the interconnected system to the isolated system. Specifically, isolated system determination unit 211 determines whether AC power system 101 has shifted from the interconnected system to the isolated system, based on phase error $\Delta\theta$ and voltage absolute value |Vs| of point-of-interconnection voltage Vs.

FIG. 6 is a diagram for illustrating a configuration of isolated system determination unit 211. Referring to FIG. 6, isolated system determination unit 211 includes a voltage determination circuit 301, phase determination circuits 302 and 303, a rate-of-change determination circuit 304, an OR circuit 305, and an AND circuit 306.

Voltage determination circuit 301 determines whether voltage absolute value |Vs| is less than a voltage threshold Vth. Specifically, if determined that |Vs|<Vth is met, voltage determination circuit 301 outputs an output value of "1" to AND circuit 306. If determined otherwise, voltage determination circuit 301 outputs an output value of "0" to AND circuit 306.

Phase determination circuit 302 determines whether phase error $\Delta\theta$ is greater than a threshold $\theta1$. Specifically, if determined that $\Delta\theta>\theta1$ is met, phase determination circuit 302 outputs an output value of "1" to OR circuit 305. If determined otherwise, phase determination circuit 302 outputs an output value of "0" to OR circuit 305.

Phase determination circuit 303 determines whether phase error $\Delta\theta$ is less than a threshold $\theta2$ (provided that $\theta2<\theta1$). Specifically, if determined that $\Delta\theta<\theta2$ is met, phase determination circuit 303 outputs an output value of "1" to OR circuit 305. If determined otherwise, phase determination circuit 303 outputs an output value of "0" to OR circuit 305.

Rate-of-change determination circuit 304 determines whether a rate of change $d\Delta\theta/dt$ in phase error $\Delta\theta$ is greater than a reference rate of change Ra. Specifically, if determined that $d\Delta\theta/dt>Ra$ is met, rate-of-change determination circuit 304 outputs an output value of "1" to AND circuit 306. If determined otherwise, rate-of-change determination circuit 304 outputs an output value of "0" to AND circuit 306.

OR circuit 305 performs an OR operation on each output value of phase determination circuits 302 and 303. Specifically, if at least one of these output values is "1," OR circuit 305 outputs an output value of "1" to AND circuit 306. Otherwise, OR circuit 305 outputs an output value of "0" to AND circuit 306.

AND circuit 306 performs an AND operation on an inverse of the output logic level of voltage determination circuit 301, an output value of OR circuit 305, and an inverse of the output logic level of rate-of-change determination circuit 304.

Specifically, if |Vs|<Vth is not met, at least one of $\Delta\theta>\theta1$ and $\Delta\theta<\theta2$ is met, and $d\Delta\theta/dt>Ra$ is not met, AND circuit 306 outputs a signal (i.e., an output value of "1") indicating that AC power system 101 has shifted from the interconnected system to the isolated system.

A reason why isolated system determination unit 211 uses the above logic to determine whether AC power system 101 has shifted from the interconnected system to the isolated system, is now described. Specifically, as generator 51 is detached from AC power system 101 due to some factor, power converter 20 will not be able to perform a frequency control in coordination with generator 51. Therefore, the frequency of AC power system 101 starts shifting due to the demand and supply of electric power falling out of balance, etc., which increases phase error $\Delta\theta$ to outside a reference range (i.e., $\Delta\theta>\theta1$ or $\Delta\theta<\theta2$ results).

Here, voltage determination circuit 301 and rate-of-change determination circuit 304 are disposed to prevent the occurrence of a minor accident at AC power system 101, which has a temporary effect on AC power system 101, from being erroneously determined as indicating that AC power system 101 has shifted to the isolated system.

Specifically, if such a minor accident occurs at AC power system 101, the voltage value at the point of interconnection decreases, and the phase changes. Therefore, when voltage absolute value |Vs| is less than voltage threshold Vth, it is contemplated that it is likely that a fault has occurred at AC power system 101. Accordingly, even though the phase error $\Delta\theta$ falls outside the reference range, AND circuit 306 does not output the signal (i.e., an output value of "1") indicating that AC power system 101 has shifted to the isolated system, if voltage absolute value |Vs| is less than voltage threshold Vth.

Moreover, if a minor accident has occurred, phase error $\Delta\theta$ rapidly changes due to system disturbance. Therefore, if rate of change $d\Delta\theta/dt$ of phase error $\Delta\theta$ is greater than reference rate of change Ra, it is contemplated that it is likely that a fault has occurred at AC power system 101. Accordingly, even though the phase error $\Delta\theta$ falls outside the reference range, AND circuit 306 does not output an output value of "1," if the rate of change $d\Delta\theta/dt$ is greater than reference rate of change Ra.

Isolated system determination unit 211 may be configured to prevent the erroneous determination as noted above, by using at least one of voltage determination circuit 301 and rate-of-change determination circuit 304.

Note that an off delay timer may be disposed between voltage determination circuit 301 and AND circuit 306, in order to more accurately distinguish between a minor accident and the shifting of AC power system 101 to the isolated system. Specifically, since the voltage value at the point of interconnection decreases immediately after a minor accident has occurred, voltage determination circuit 301 outputs an output value of "1", and the off delay timer maintains the output value of "1" for a time T1.

Since the phase at the point-of-interconnection voltage changes too, the phase error $\Delta\theta$ falls outside the reference range. However, AND circuit 306 does not output an output value of "1" until time T1 has elapsed since the detection of a reduction in point-of-interconnection voltage value. Subsequently, once the minor accident is resolved, the voltage value and phase at the point of interconnection return to a normal state, and phase error $\Delta\theta$ falls within the reference range. In this case also, AND circuit 306 does not output an output value of "1." In this way, the occurrence of a minor accident can be more accurately prevented from being erroneously determined as AC power system 101 having shifted to the isolated system by the off delay timer maintaining an output value of "1" for time T1.

Note that, if AC power system 101 has shifted to the isolated system, phase error $\Delta\theta$ is maintained outside the reference range, unlike a minor accident. Thus, AND circuit 306 outputs an output value of "1".

In summary of the determination scheme described above, isolated system determination unit 211 determines that AC power system 101 has shifted from the interconnected system to the isolated system if a condition C1 that the phase error $\Delta\theta$ is outside the reference range (i.e., $\Delta\theta>\theta1$ or $\Delta\theta<\theta2$), a condition C2 that the voltage absolute value |Vs| of point-of-interconnection voltage Vs is greater than voltage threshold Vth, and a condition C3 that the rate of change in phase error $\Delta\theta$ is less than reference rate of change Ra, hold true. Note that isolated system determination unit 211 may determine that AC power system 101 has shifted from the interconnected system to the isolated system if condition C1 and condition C2 hold true or if condition C1 and condition C3 hold true.

<Control Scheme when Interconnected with Isolated System>

Figure 7:
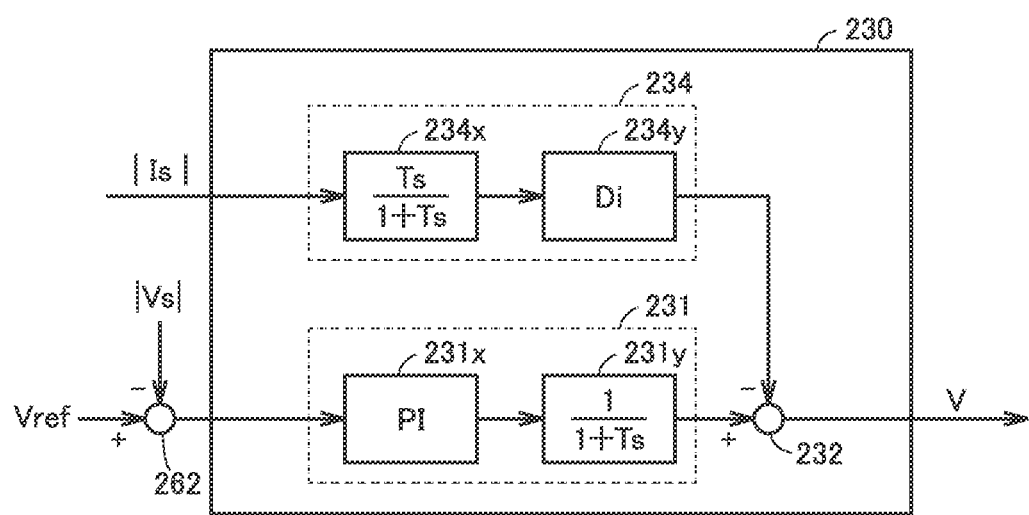
FIG. 7 is a diagram illustrating one example configuration of a compensator and a droop calculator, which are included in a voltage control unit.
Figure 8:
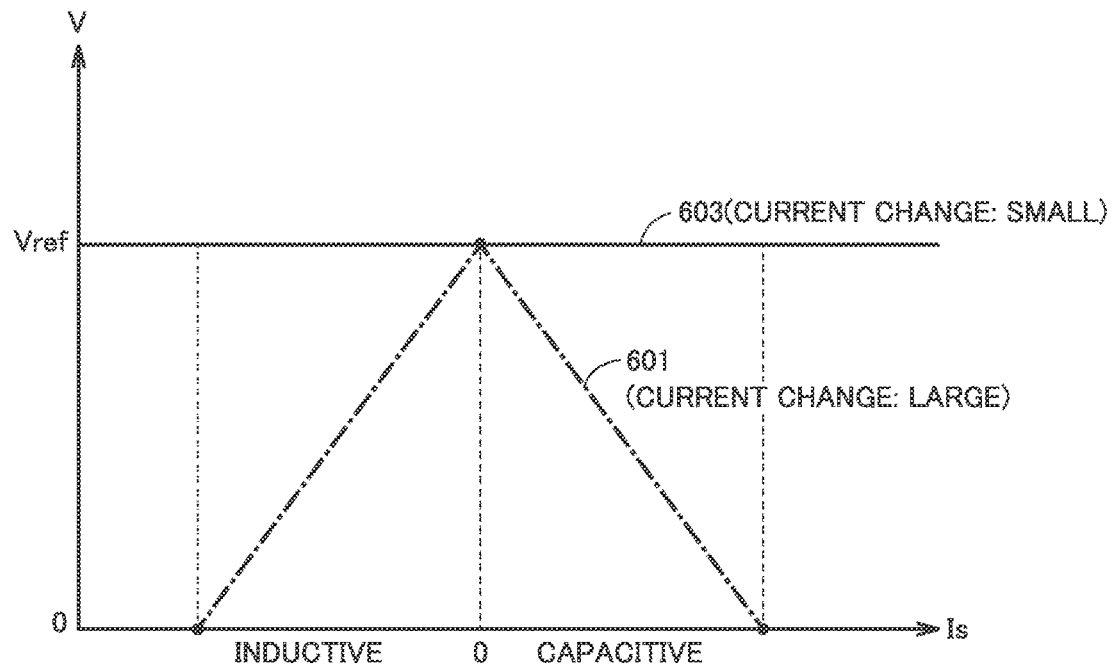
FIG. 8 is a diagram for illustrating one example of a current versus a voltage value, at a point of interconnection.

Next, referring to FIGS. 5, 7, and 8, a control scheme for power converter 20 when interconnected with AC power system 101 having shifted to the isolated system, is described.

Referring to FIG. 5, if determined that AC power system 101 has shifted to the isolated system, isolated system determination unit 211 outputs an OFF signal to switch 225, and an ON signal to switch 260. This brings switch 225 into an OFF state, and switch 260 into an ON state.

When AC power system 101 is the isolated system, frequency control unit 220 generates phase θ under a control scheme in an isolated system mode. Specifically, Δω, output from compensator 222 of phase generation unit 221, is not input to adder 223. Therefore, phase generation unit 221 time-integrates the reference angular frequency ω0, thereby generating phase θ of the voltage command.

More specifically, adder 223 outputs reference angular frequency ω0 of power converter 20 to time integrator 224, as angular frequency ω. Time integrator 224 time-integrates the angular frequency ω (i.e., reference angular frequency ω0), thereby calculating phase θ of the voltage command, and outputs phase θ to command unit 250. In this case, the phase θ remains unchanged. Thus, power converter 20, with input of the voltage command having phase θ from command unit 250, generates a voltage having a constant frequency.

Moreover, when AC power system 101 is the isolated system, switch 260 is in an ON state. In this case, voltage control unit 230 generates voltage value V under the control scheme in the isolated system mode. Specifically, current absolute value |Is|, calculated by current computation unit 209, is input to droop calculator 234 of voltage control unit 230. Droop calculator 234 computes and outputs a droop value as a function of current absolute value |Is| to adder-subtractor 232.

FIG. 7 is a diagram illustrating one example configuration of compensator 231 and droop calculator 234 of voltage control unit 230. Referring to FIG. 7, compensator 231 subjects to a primary lag process a value obtained by compensating for voltage deviation ΔVr, thereby computing and outputting a compensation voltage value to adder-subtractor 232. Specifically, compensator 231 includes a PI controller 231x, and a primary lag element 231y.

With input of voltage deviation ΔVr, PI controller 231x outputs to primary lag element 231y a value obtained by performing a feedback control so that voltage deviation ΔVr is compensated for.

Primary lag element 231y is a filter represented by a transfer function G1 (=1/(1+Ts)). Using transfer function G1, primary lag element 231y subjects to a filtering process (i.e., the primary lag process) the value output from PI controller 231x to calculate a compensation voltage value, and outputs the compensation voltage value to adder-subtractor 232.

Droop calculator 234 subjects to an imperfectly differentiating process the current absolute value |Is|, and multiplies the current absolute value |Is| by Di to calculate a droop value DIs. Specifically, droop calculator 234 includes an imperfectly differentiating element 234x, and a droop coefficient element 234y.

Imperfectly differentiating element 234x is a filter represented by a transfer function G2 (=Ts/(1+Ts)). Imperfectly differentiating element 234x subjects the current absolute value |Is| to a filtering process (i.e., the imperfectly differentiating process) using transfer function G2, and outputs the filtered current absolute value |Is| to droop coefficient element 234y. Note that a deadband element may be disposed at the preceding stage of imperfectly differentiating element 234x (i.e., between switch 260 and imperfectly differentiating element 234x). This can inhibit unwanted operation when the current is small.

Droop coefficient element 234y outputs to adder-subtractor 232 droop value DIs obtained by subjecting the current absolute value |Is| to the imperfectly differentiating process and multiplying the current absolute value |Is| by Di. Coefficient Di indicates the slope of the current droop characteristics of droop calculator 234. Droop value DIs is a voltage value for correcting the compensation voltage value.

Adder-subtractor 232 calculates a difference between droop value DIs and the compensation voltage value, as voltage value V of the voltage command, and outputs voltage value V to command unit 250. Adder-subtractor 232 serves as a calculation unit which calculates voltage value V.

FIG. 8 is a diagram for illustrating one example of point-of-interconnection current Is versus voltage value V. Referring to FIG. 8, in the event of an accident at AC power system 101, point-of-interconnection voltage Vs varies steeply, which rapidly changes point-of-interconnection current Is. In this case, the greater the current absolute value |Is| is, the greater the droop value DIs is. This is because current absolute value |Is| has been subjected to the imperfectly differentiating process. The greater the current absolute value |Is| is, the less the difference between droop value DIs and the compensation voltage value (i.e., voltage value V) is. Thus, voltage value V changes as a function of point-of-interconnection current Is, as indicated by a graph 601. In this way, the voltage value V is reduced as the current absolute value |Is| increases, thereby preventing an overcurrent from flowing through power converter 2, allowing power converter 2 to continue to operate.

In contrast, when point-of-interconnection current Is gradually changes with gradual variation in point-of-interconnection voltage Vs, droop value DIs is very small because current absolute value |Is| has been subjected to the imperfectly differentiating process. In this case, voltage value V is generally the same as the compensation voltage value output from compensator 231, and maintained constant, as indicated by a graph 603. Specifically, voltage value V is fixed at or around reference voltage value Vref. In other words, voltage value V is constant whether point-of-interconnection current Is is inductive (i.e., the lagging reactive current flowing out of power converter 20 to AC power system 101 is negative) or capacitive (i.e., the lagging reactive current flowing out of power converter 20 is positive).

With the above configuration, in the event an accident occurs at AC power system 101, which is the isolated system, and the voltage has changed steeply, control device 10 can prevent the occurrence of overcurrent by reducing the voltage to be output from power converter 20. When the voltage at AC power system 101 gradually varies, control device 10 can cause power converter 20 to output a constant voltage.

(Variation)

Figure 9:
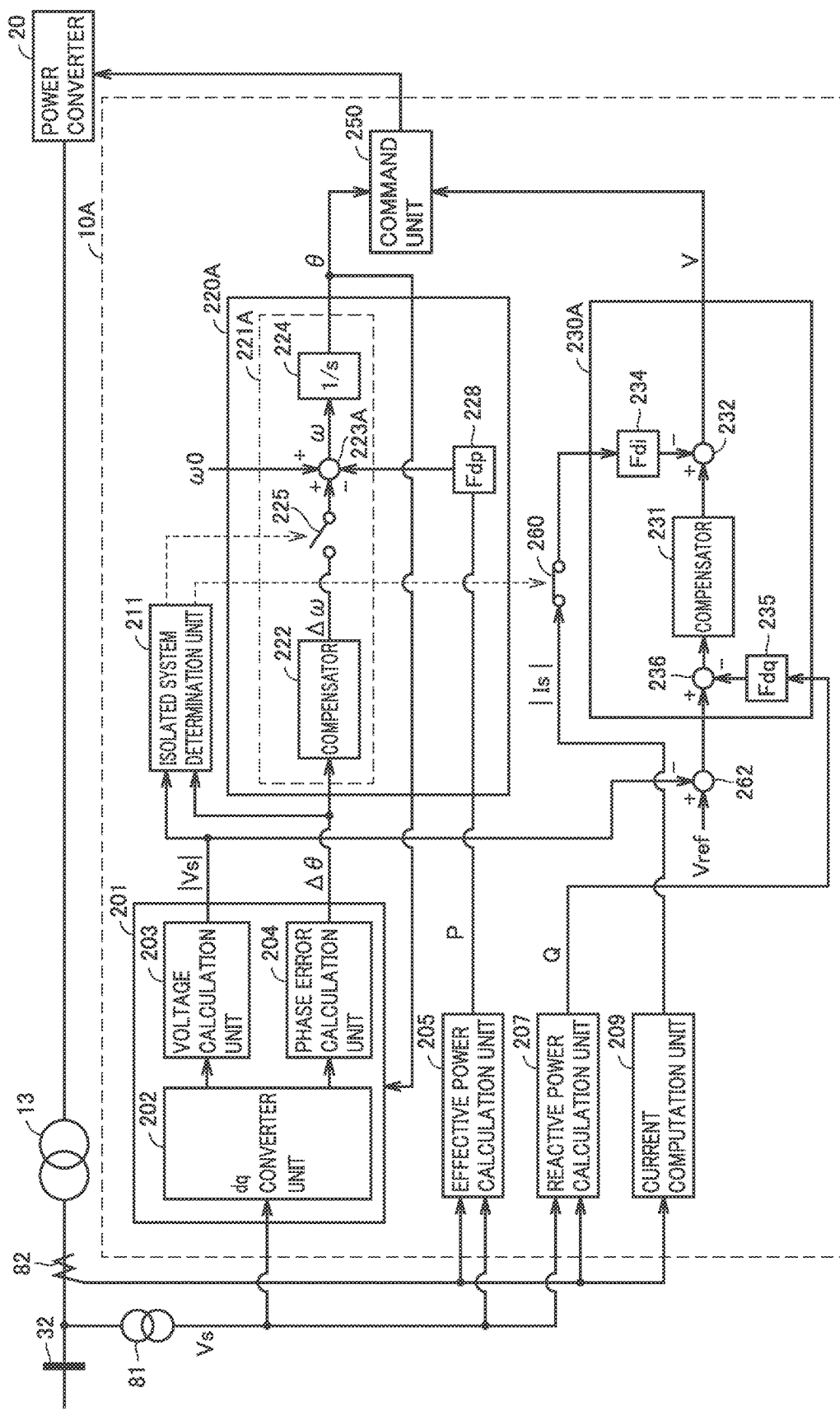
FIG. 9 is a diagram for illustrating another example functional configuration of the control device.
Figure 10:
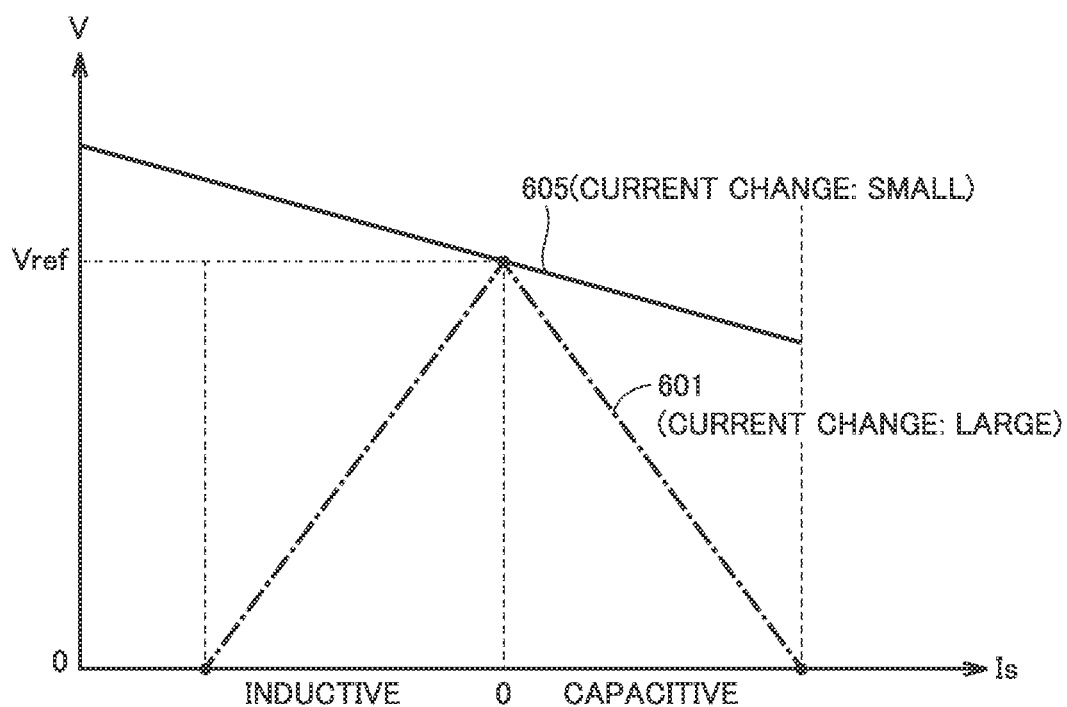
FIG. 10 is a diagram for illustrating another example of the current versus the voltage value, at the point of interconnection.
Figure 11:
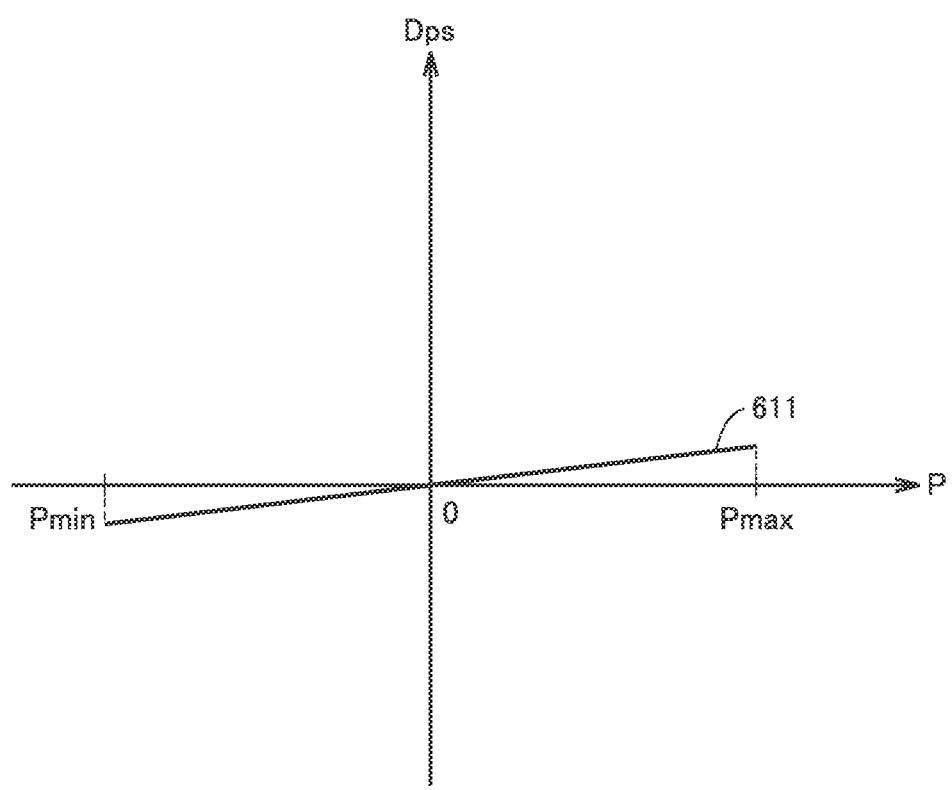
FIG. 11 is a diagram showing frequency droop characteristics.

Referring to FIGS. 9, 10, and 11, a variation of the control scheme for power converter 20 when AC power system 101 is the isolated system, is now described.

FIG. 9 is a diagram for illustrating another example functional configuration of control device 10. Referring to FIG. 9, control device 10A has voltage computation unit 201, an effective power calculation unit 205, a reactive power calculation unit 207, current computation unit 209, isolated system determination unit 211, frequency control unit 220A, voltage control unit 230A, command unit 250, switch 260, and adder-subtractor 262. Here, a functional configuration that differs from the functions shown in FIG. 5, is described. While control device 10A corresponds to control device 10 shown in FIG. 1, an additional sign "A" is appended to control device 10, for convenience, in order to differentiate it from control device 10 of FIG. 5.

Effective power calculation unit 205 calculates an effective power P at the point of interconnection. Specifically, effective power calculation unit 205 calculates effective power P at the point of interconnection, based on point-of-interconnection voltage Vs detected by AC voltage detector 81 and point-of-interconnection current Is detected by AC current detector 82.

Reactive power calculation unit 207 calculates a reactive power Q at the point of interconnection. Specifically, reactive power calculation unit 207 calculates reactive power Q at the point of interconnection, based on point-of-interconnection voltage Vs and point-of-interconnection current Is.

Voltage control unit 230A corresponds to voltage control unit 230 of FIG. 5 having a droop calculator 235 (corresponding to "Fdq" of FIG. 9) and an adder-subtractor 236 added thereto. Droop calculator 235 receives an input of reactive power Q calculated by reactive power calculation unit 207. Droop calculator 235 computes droop value Dqs as a function of reactive power Q, and outputs droop value Dqs to adder-subtractor 236. Specifically, droop value Dqs is a value obtained by multiplying reactive power Q by Dq. Coefficient Dq indicates the slope of voltage droop characteristics of droop calculator 235. Note that the voltage droop characteristics reduce the voltage as the reactive power output (i.e., the lagging reactive current flowing out of power converter 20) increases. Note that reactive current may be employed, instead of reactive power.

Adder-subtractor 236 receives an input of voltage deviation ΔVr from adder-subtractor 262, and an input of droop value Dqs from droop calculator 235. Adder-subtractor 236 subtracts droop value Dqs from voltage deviation ΔVr, and outputs a value ΔVrq subtracted from voltage deviation ΔVr (hereinafter, also referred to as "subtrahend ΔVrq") to compensator 231. Based on subtrahend ΔVrq, compensator 231 calculates a compensation voltage value. Specifically, compensator 231 subjects a value, obtained by compensating for subtrahend ΔVrq, to the primary lag process to calculate a compensation voltage value, and outputs the compensation voltage value to adder-subtractor 232. More specifically, PI controller 231x receives an input of subtrahend ΔVrq, and outputs to primary lag element 231y a value obtained by performing a feedback control so that subtrahend ΔVrq is compensated for. Primary lag element 231y subjects a value output from PI controller 231x to a filtering process using the transfer function G1 to calculate a compensation voltage value, and outputs the compensation voltage value to adder-subtractor 232.

Adder-subtractor 232 calculates a difference between droop value DIs and the compensation voltage value, as voltage value V of the voltage command, and outputs voltage value V to command unit 250.

FIG. 10 is a diagram for illustrating another example of point-of-interconnection current Is versus voltage value V. Referring to FIG. 10, when point-of-interconnection current Is rapidly changes, voltage value V changes as a function of point-of-interconnection current Is, as indicated by a graph 601, as with FIG. 8. In other words, the greater the current absolute value |Is| is, the less the voltage value V is. Therefore, the occurrence of overcurrent can be inhibited even in the event of an accident at AC power system 101, which is the isolated system.

In contrast, when point-of-interconnection current Is gradually changes, voltage value V, rather than being constant as shown in FIG. 8, gradually changes as a function of point-of-interconnection current Is. This is because the compensation voltage value is calculated based on subtrahend ΔVrq obtained by subtracting droop value Dqs from voltage deviation ΔVr. When point-of-interconnection current Is is inductive (i.e., the lagging reactive current flowing out of power converter 20 is negative), voltage value V increases in proportion to the magnitude of point-of-interconnection current Is. When point-of-interconnection current Is is capacitive (i.e., the lagging reactive current flowing out of power converter 20 is positive), voltage value V decreases in proportion to the magnitude of point-of-interconnection current Is.

Referring, again, to FIG. 9, frequency control unit 220A includes a phase generation unit 221A and a droop calculator 228 (corresponding to "Fdp" in FIG. 9). When AC power system 101 is the isolated system, compensating angular frequency Δω is not input to adder 223. Therefore, phase generation unit 221A subtracts from reference angular frequency ω0 a droop value obtained by multiplying effective power P by Dq, and time-integrates the subtrahend, thereby generating phase θ. Specifically, phase generation unit 221A corresponds to phase generation unit 221 of FIG. 5, including adder-subtractor 223A replacing adder 223.

Droop calculator 228 receives an input of effective power P calculated by effective power calculation unit 205. Droop calculator 228 computes a droop value Dps as a function of effective power P, and outputs droop value Dps to adder-subtractor 223A. Specifically, droop value Dps is a value obtained by multiplying effective power P by Dp, and is an angular frequency for compensating for angular frequency ω0. Coefficient Dp indicates the slope of frequency droop characteristics of droop calculator 228. Note that an effective current may be employed, instead of effective power P.

FIG. 11 is a diagram showing the frequency droop characteristics. Assume that the direction in which effective power P is output from power converter 20 is positive. Pmax is the maximum of effective power P. Pmin is the minimum of effective power P. The more the effective power P increases, the greater the droop value Dps is, as indicated by frequency droop characteristics 611 of FIG. 11.

Referring, again, to FIG. 9, adder-subtractor 223A outputs angular frequency ω to time integrator 224. Angular frequency ω is the deviation of droop value Dps from reference angular frequency ω0 (i.e., a value obtained by subtracting droop value Dps from reference angular frequency ω0). This suggests that the greater the effective power P increases (i.e., greater the droop value Dps increases), the less the angular frequency ω is. Time integrator 224 time-integrates the angular frequency ω to calculate phase θ, and outputs phase θ to command unit 250.

With the configuration of the above variation, the frequency is adjusted as a function of the effective power output from power converter 20, and the voltage is adjusted as a function of the reactive power. Therefore, power converter 20 can be operated in a more stable manner. Moreover, for example, when multiple power converters 20 are used to supply an electric power to AC power system 101, which is the isolated system, the outputs of respective power converters 20 can be kept in balance.

Figure 12:
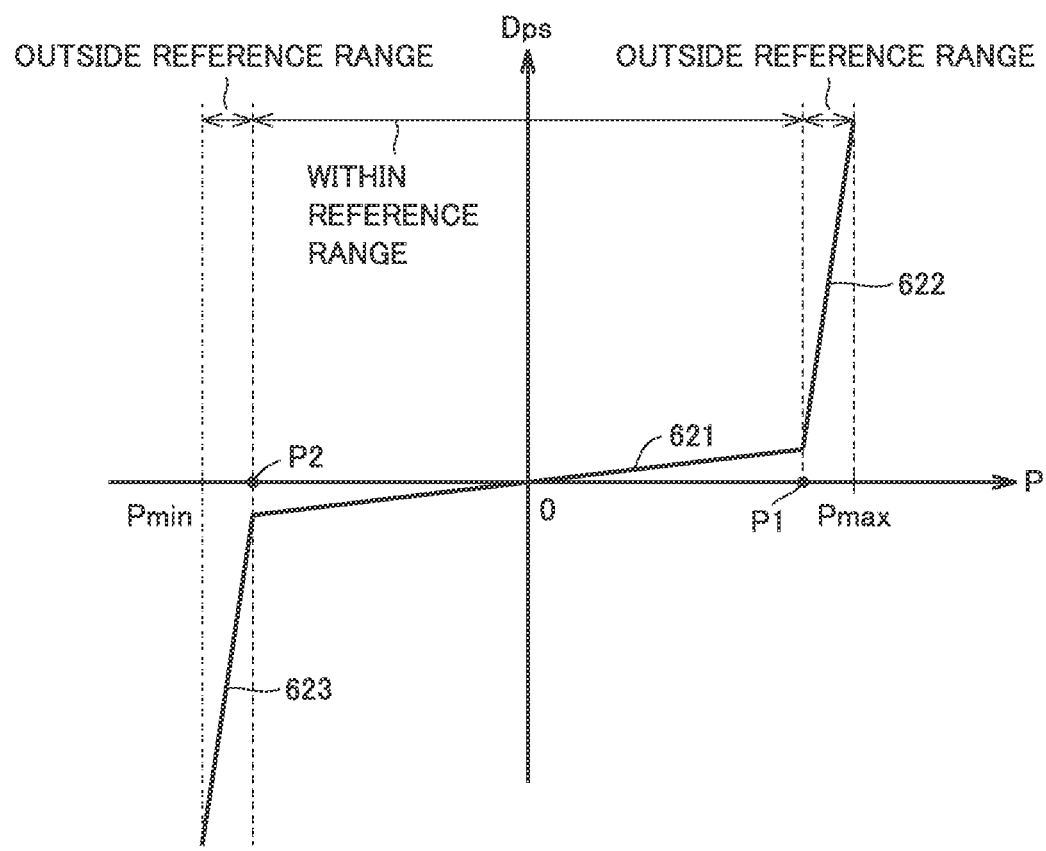
FIG. 12 is a diagram showing non-linear frequency droop characteristics.

Here, the frequency droop characteristics may be non-linear characteristics, as shown in FIG. 12. FIG. 12 is a diagram showing non-linear frequency droop characteristics. Assume that the direction in which effective power P is output from power converter 20 is positive.

Referring to FIG. 12, non-linear frequency droop characteristics (hereinafter, also referred to as "non-linear droop characteristics") has: a droop characteristic 621 in which effective power P at the point of interconnection is within the reference range; and droop characteristics 622 and 623 in which effective power P is outside the reference range. Droop characteristics 622 and 623 have greater slopes than droop characteristic 621.

In the example of FIG. 12, effective power P is within the reference range when effective power P meets P2≤P≤P1. Effective power P is outside the reference range when Pmin≤P<P2 or P1<P≤Pmax.

When effective power P is within the reference range, droop calculator 228 computes droop value Dps, in accordance with droop characteristic 621. When effective power P is outside the reference range, droop calculator 228 computes droop value Dps, in accordance with droop characteristics 622 and 623. For example, if effective power P output from power converter 20 increases greater than expected due to some factor, effective power P falls outside the reference range. In this case, droop value Dps, since it follows droop characteristic 622, increases rapidly. As a result, angular frequency ω decreases rapidly, causing the output from power converter 20 to fall within an expected range. Thus, occurrence of overcurrent can be inhibited.

Note that, if effective power P output from power converter 20 decreases greater than expected, droop value Dps decreases rapidly and angular frequency ω increases rapidly. In this case also, the output from power converter 20 falls within an expected range. Thus, occurrence of overcurrent can be inhibited.

<Shock Mitigation Upon Change in Control Scheme>

In FIG. 5, the description has been given in which if AC power system 101 is determined as having shifted to the isolated system, switch 225 is controlled to an OFF state, thereby changing the control scheme of frequency control unit 220. In this case, at a moment the switch 225 is brought into the OFF state, no more compensating angular frequency Δω is input to adder 223.

Therefore, for example, if compensating angular frequency Δω is great immediately before AC power system 101 shifts to the isolated system, angular frequency ω changes rapidly, which may give a shock (e.g., such as overcurrent) to power converter 20. Thus, a configuration is now described in which compensating angular frequency Δω is gradually reduced when AC power system 101 is determined as having shifted to the isolated system.

Figure 13:
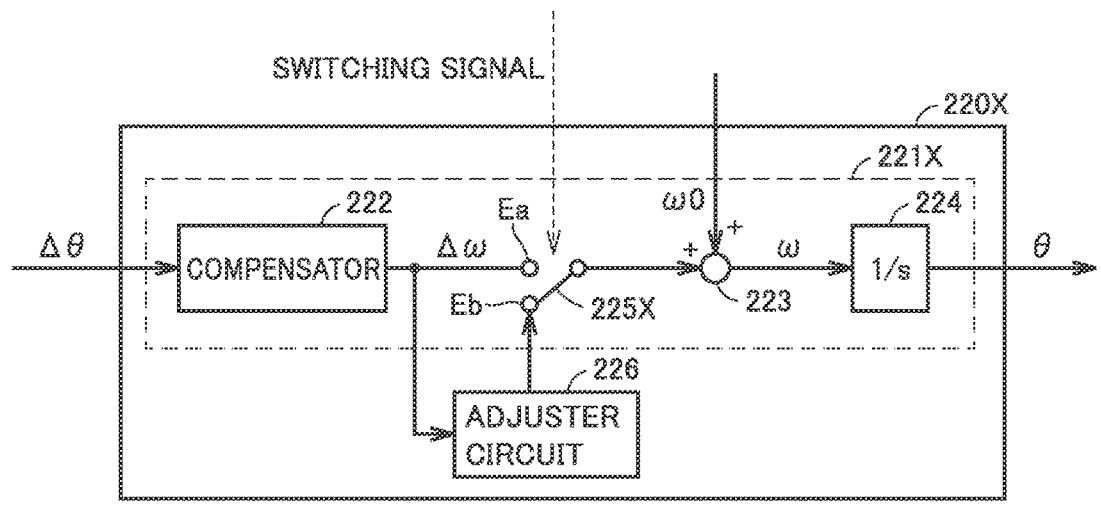
FIG. 13 is a diagram illustrating one example configuration of a frequency control unit for shock mitigation.

FIG. 13 is a diagram illustrating one example configuration of the frequency control unit for shock mitigation. Referring to FIG. 13, a frequency control unit 220X includes a phase generation unit 221X and an adjuster circuit 226. Phase generation unit 221X corresponds to phase generation unit 221 of FIG. 5 having a switch 225X replacing switch 225.

Here, when AC power system 101 is the interconnected system, switch 225X is connected to a junction Ea. If determined that AC power system 101 has shifted to the isolated system, isolated system determination unit 211 outputs to switch 225X a switching signal for switching switch 225X from junction Ea to a junction Eb. This causes compensating angular frequency Δω to be input to adder 223 via adjuster circuit 226.

After AC power system 101 has shifted to the isolated system, adjuster circuit 226 gradually reduces the compensating angular frequency ω0. Specifically, adjuster circuit 226 fixes compensating angular frequency Δω at a value immediately before AC power system 101 shifts to the isolated system, and gradually reduces the fixed compensating angular frequency Δω. Adjuster circuit 226 is implemented in, for example, a hold element and a washout filter which passes changes in signal and cuts the stationary signal. For example, adjuster circuit 226 changes compensating angular frequency Δω, as shown in FIG. 14.

Figure 14:
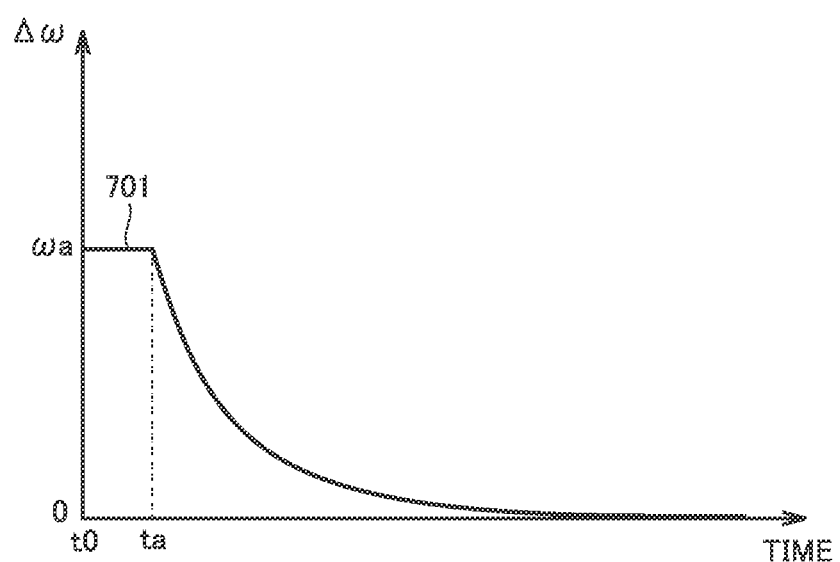
FIG. 14 is a diagram illustrating one example of changes in compensating angular frequency over time.

FIG. 14 is a diagram illustrating one example of changes in compensating angular frequency Δω over time. Referring to FIG. 14, a compensating angular frequency ωa is a value of compensating angular frequency Δω that is output from compensator 222 before switch 225X is switched from junction Ea to junction Eb. At time ta, switch 225X is switched to junction Eb by a switching signal from isolated system determination unit 211.

As indicated by a graph 701, compensating angular frequency Δω is maintained at compensating angular frequency ωa during a period from time t0 to time ta. After time ta, compensating angular frequency Δω gradually decreases to zero.

Referring, again, to FIG. 13, adder 223 adds compensating angular frequency Δω reduced by adjuster circuit 226 and reference angular frequency ω0, and outputs the sum to time integrator 224. Time integrator 224 time-integrates the sum to generate a phase θ of a voltage command.

With the above configuration, since compensating angular frequency Δω input to adder 223 gradually decreases, rapid change in angular frequency ω can be prevented even if AC power system 101 has shifted to the isolated system. As a result, a shock applied to power converter 20 is mitigated.

(Variation)

Figure 15:
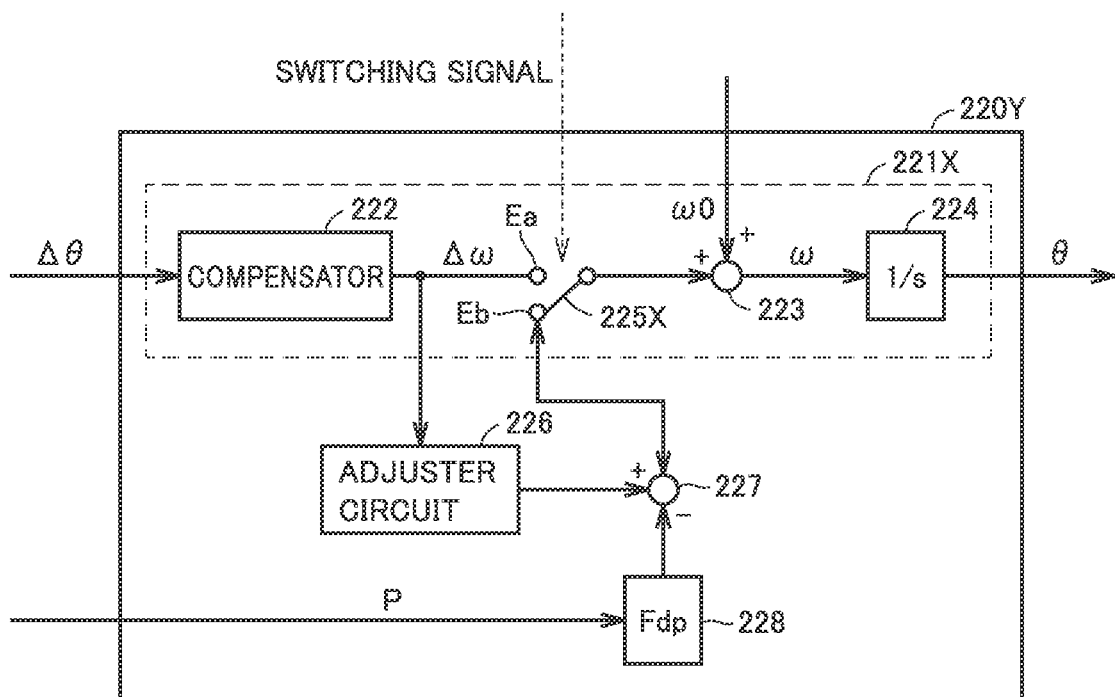
FIG. 15 is a diagram showing another example configuration of the frequency control unit for shock mitigation.

FIG. 15 is a diagram showing another example configuration of the frequency control unit for shock mitigation. Referring to FIG. 15, a frequency control unit 220Y corresponds to phase generation unit 221X of FIG. 13 having droop calculator 228 and an adder-subtractor 227 added thereto. Here, assume that AC power system 101 has been shifted to the isolated system and switch 225X has been switched to junction Eb, as described with respect to FIG. 13.

A droop calculator 228 computes droop value Dps as a function of effective power P to ramp the limiter, thereby outputting droop value Dps to adder-subtractor 227. This causes the limiter to change linearly, starting from zero, which prevents droop value Dps greater than expected from being output to adder-subtractor 227.

Adder-subtractor 227 calculates a difference between droop value Dps and compensating angular frequency Δω output from adjuster circuit 226, and outputs the difference to adder 223. In this case, the difference changes as shown in FIG. 16.

Figure 16:
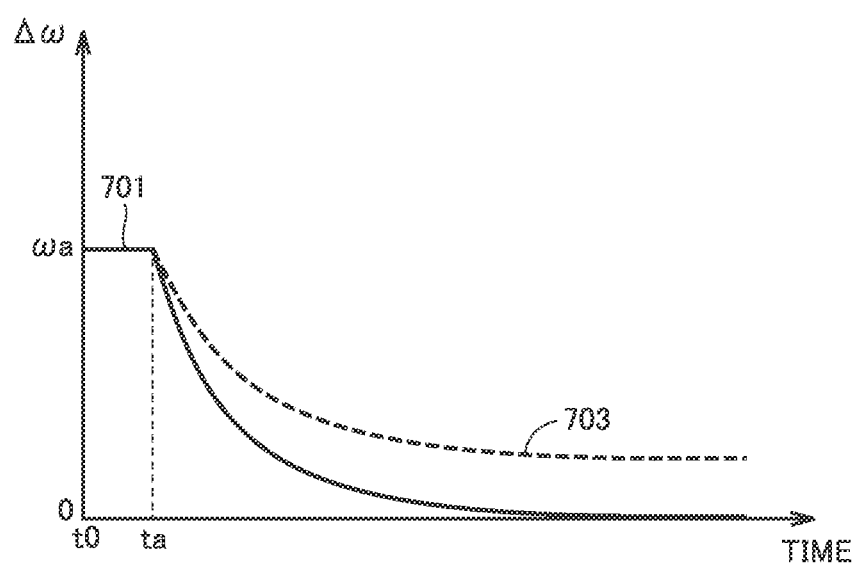
FIG. 16 is a diagram showing another example of changes in compensating angular frequency over time.

FIG. 16 is a diagram showing another example of changes in compensating angular frequency Δω over time. Referring to FIG. 16, compensating angular frequency Δω changes as indicated by a graph 703. Graph 703 is the same as graph 701 in that compensating angular frequency Δω is maintained at compensating angular frequency ωa during a period from time t0 to time ta. However, after time ta, compensating angular frequency Δω according to graph 703 changes more gradually than compensating angular frequency Δω according to graph 701. This is due to droop value Dps.

Referring, again, to FIG. 15, adder 223 adds reference angular frequency ω0 and the difference between droop value Dps from compensating angular frequency Δω, and outputs the sum to time integrator 224. Time integrator 224 time-integrates the sum to generate a phase θ of a voltage command.

In this case also, compensating angular frequency Δω input to adder 223 gradually decreases. Thus, rapid change in angular frequency ω can be prevented, mitigating a shock applied to power converter 20.

<Determination Scheme as to Shift to Interconnected System (Part 1)>

Here, a determination scheme is described, for determining whether generator 51 is connected to AC power system 101 being the isolated system, and AC power system 101 has shifted from the isolated system to the interconnected system.

Figure 17:
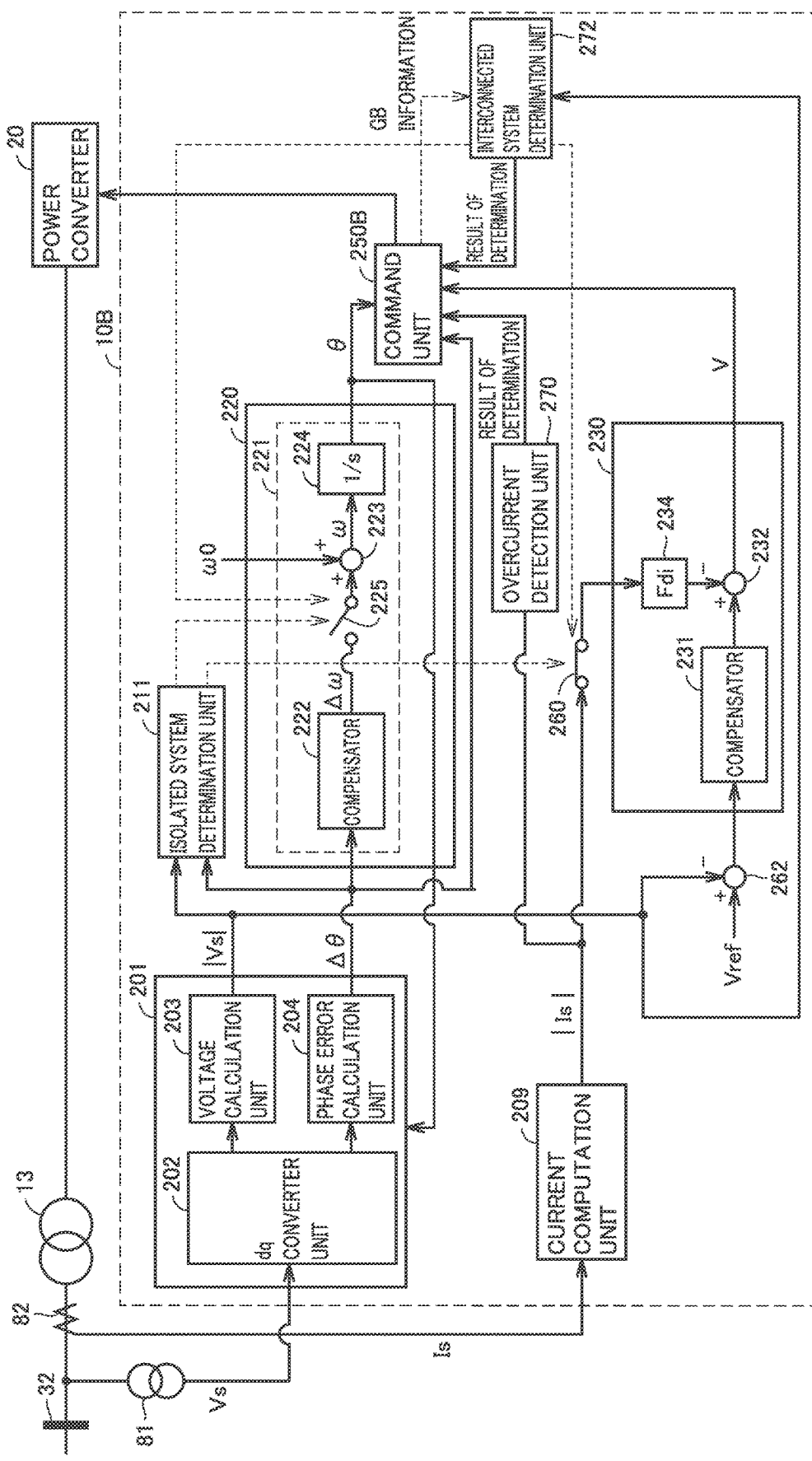
FIG. 17 is a diagram illustrating one example functional configuration of the control device for determining whether the AC power system has shifted to an interconnected system.

FIG. 17 is a diagram illustrating one example functional configuration of control device 10 for determining whether the AC power system has shifted to the interconnected system. Referring to FIG. 17, a control device 10B corresponds to control device 10 of FIG. 5 having an overcurrent detection unit 270 and an interconnected system determination unit 272 added thereto, and replacing command unit 250 of FIG. 5 with a command unit 250B. While control device 10B corresponds to control device 10 shown in FIG. 1, an additional sign "B" is appended to control device 10, for convenience, in order to differentiate it from control device 10 of FIG. 5.

Here, a functional configuration that differs from the functions shown in FIG. 5 is described. Assume that switch 225 is in an OFF state, and switch 260 is in an ON state. Assume that control device 10B controls power converter 20 in a control scheme (i.e., the isolated system mode) for AC power system 101 being the isolated system.

Based on current absolute value |Is| received from current computation unit 209, overcurrent detection unit 270 determines whether point-of-interconnection current Is is overcurrent. Specifically, if current absolute value |Is| is greater than or equal to a threshold Ith, overcurrent detection unit 270 determines that point-of-interconnection current Is is overcurrent. If current absolute value |Is| is less than threshold Ith, overcurrent detection unit 270 determines that point-of-interconnection current Is is not overcurrent. Overcurrent detection unit 270 outputs a result of the determination to command unit 250B.

Note that overcurrent detection unit 270 may perform the overcurrent determination, using currents Ipu, Inu, Ipv, Inv, Ipw, and Inw of the respective arms, instead of the point-of-interconnection current. In this case, if at least one of the absolute values of the respective arm currents is greater than or equal to a threshold Iths, overcurrent detection unit 270 determines that an arm current is overcurrent. If the absolute values of all the arm currents are less than threshold Iths, overcurrent detection unit 270 determines that no arm current is overcurrent.

Upon receipt of a result of determination indicating that point-of-interconnection current Is or arm current is overcurrent, command unit 250B outputs a stop command for stopping the operation of power converter 20, as a control command. Specifically, the stop command is a gate block command. This brings power converter 20 into a gate block state, that is, brings switching elements 22A and 22B of each sub-module 7 into an off state.

Command unit 250B, if output a stop command to power converter 20, outputs GB information to interconnected system determination unit 272, the GB information indicating that power converter 20 is in a gate block state.

Based on the GB information and voltage absolute value |Vs|, interconnected system determination unit 272 determines whether AC power system 101 has shifted from the isolated system to the interconnected system. Specifically, if received the GB information (i.e., the operation of power converter 20 is stopped) and voltage absolute value |Vs| is greater than or equal to a threshold Vk, interconnected system determination unit 272 determines that AC power system 101 has shifted from the isolated system to the interconnected system because it is contemplated that a power supply (i.e., generator 51), other than power converter 20, is connected to AC power system 101 if voltage absolute value |Vs| is greater than or equal to a certain value although the operation of power converter 20 is stopped.

Interconnected system determination unit 272 outputs a result of determination indicating that AC power system 101 has shifted to the interconnected system to command unit 250B. If determined that AC power system 101 has shifted to the interconnected system, interconnected system determination unit 272 also outputs an ON signal to switch 225, and an OFF signal to switch 260. This brings switch 225 into an ON state, and switch 260 into an OFF state.

If AC power system 101 has shifted to the interconnected system and phase error Δθ is less than a threshold θa, command unit 250B outputs to power converter 20 a restore command for restoring the operation of power converter 20. Specifically, the restore command is a deblock command. This brings power converter 20 into a deblock state, that is, brings switching elements 22A and 22B of each sub-module 7 to be ready to be turned on.

Figure 18:
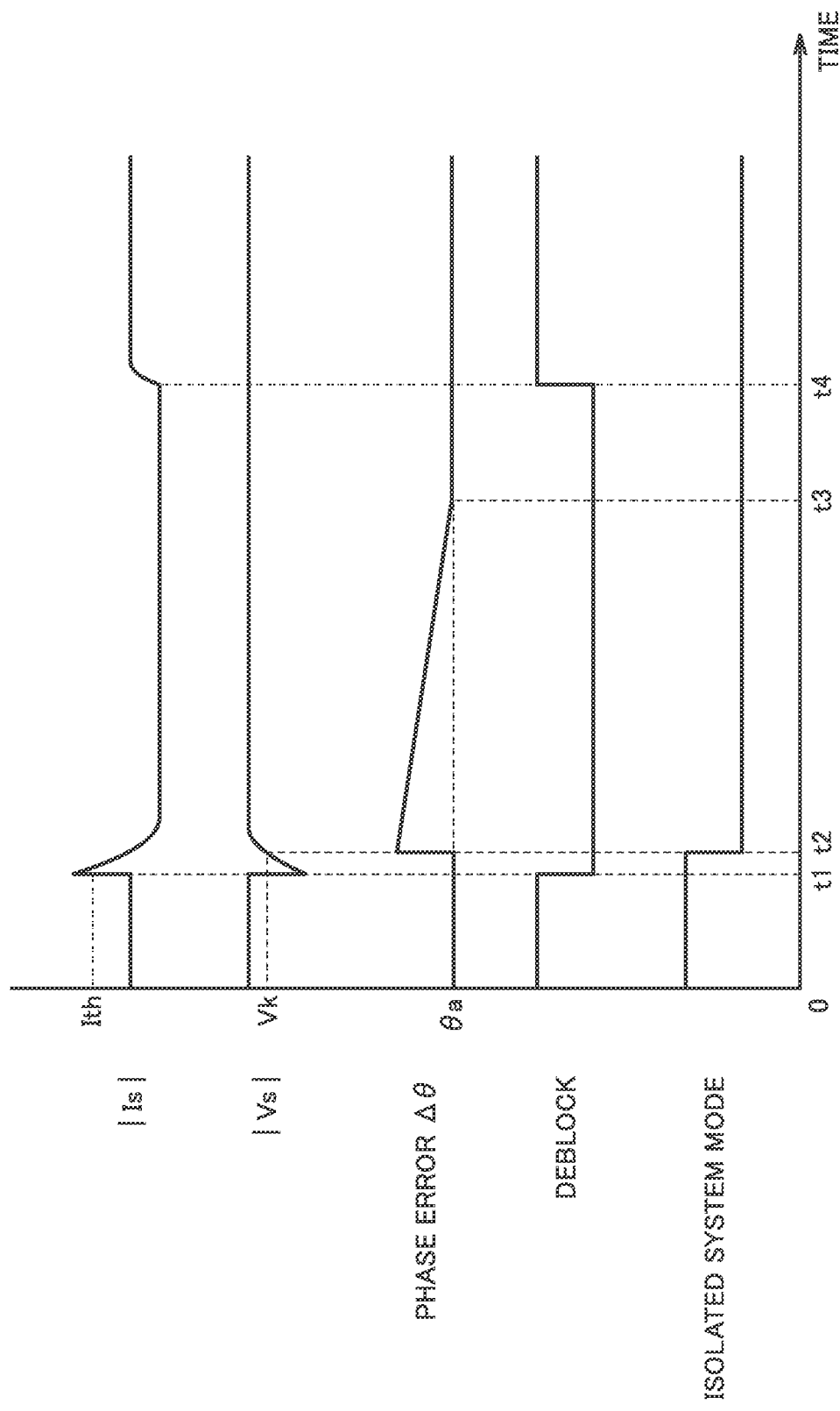
FIG. 18 is a timing chart for illustrating an operation of the control device when the AC power system has shifted to the interconnected system.

A flow of the operation of control device 10B is now described with reference to FIG. 18. FIG. 18 is a timing chart for illustrating an operation of control device 10B when the AC power system has shifted to the interconnected system. Here, for ease of description, assume that overcurrent detection unit 270 determines whether point-of-interconnection current Is is overcurrent. Referring to FIG. 18, overcurrent is generated at time t1. In this case, overcurrent detection unit 270 determines that current absolute value |Is| is greater than or equal to threshold Ith. Therefore, command unit 250B outputs a gate block command to power converter 20. This stops the operation of power converter 20.

At time t2, as voltage absolute value |Vs| increases to threshold Vk or greater when power converter 20 is in a gate block state, interconnected system determination unit 272 determines that AC power system 101 has shifted to the interconnected system, and outputs an ON signal to switch 225, and an OFF signal to switch 260. This changes the control scheme of control device 10B from the isolated system mode to the interconnected system mode. Immediately after the control scheme is changed to the interconnected system mode, the phase difference between phase θ of the voltage command and the phase of point-of-interconnection voltage Vs is great. Thus, phase error Δθ increases rapidly.

Subsequently, phase error Δθ is gradually reduced by feedback control performed by frequency control unit 220, and phase error Δθ decreases less than threshold θa at time t3. This means that phase θ of the voltage command is in sync with the phase of point-of-interconnection voltage Vs. Therefore, at time t4, command unit 250B outputs a deblock command to power converter 20. This restores power converter 20, causing the power converter 20 continue to operate in accordance with the control scheme in the interconnected system mode.

With the above configuration, control device 10B can accurately determine that AC power system 101 has shifted from the isolated system to the interconnected system. The operation of power converter 20 is restored when phase error Δθ is reduced (i.e., the synchronization is completed between phase θ of the voltage command and the phase of point-of-interconnection voltage Vs), rather than restoring the operation of power converter 20 immediately after AC power system 101 is determined as having shifted to the interconnected system. Therefore, power converter 20 can be prevented from being brought into an overcurrent state.

<Determination Scheme as to Shift to Interconnected System (Part 2)>

Another determination scheme is described, for determining whether AC power system 101 has shifted from the isolated system to the interconnected system.

Figure 19:
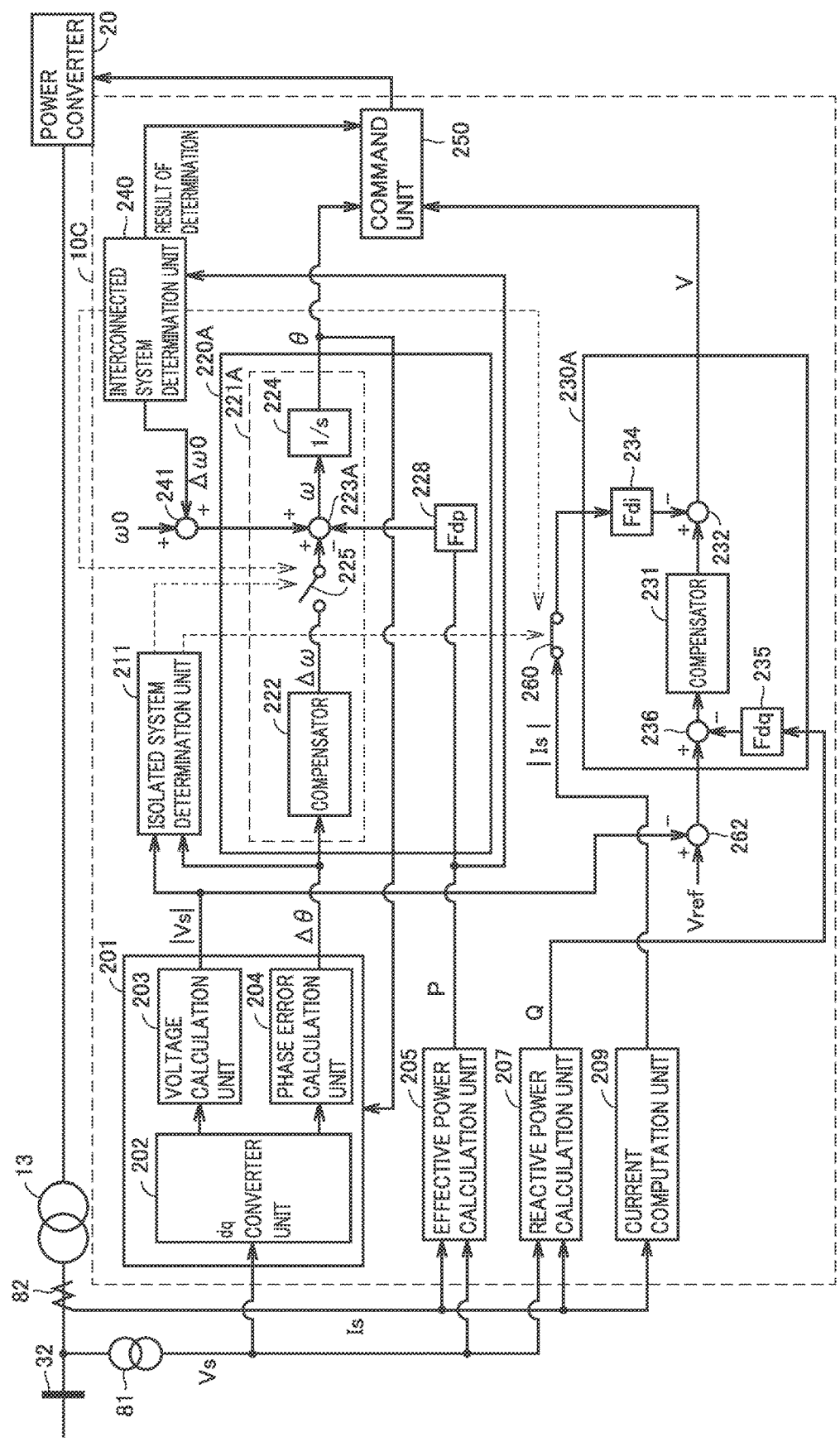
FIG. 19 is a diagram showing another functional configuration example of the control device for determining whether the AC power system has shifted to the interconnected system.

FIG. 19 is another functional configuration example of control device 10 for determining whether the AC power system has shifted to the interconnected system. Referring to FIG. 19, a control device 10C corresponds to control device 10A of FIG. 9 having an interconnected system determination unit 240 and an adder 241 added thereto. While control device 10C corresponds to control device 10 shown in FIG. 1, an additional sign "C" is appended to control device 10, for convenience, in order to differentiate it from control device 10A of FIG. 9.

Here, a functional configuration that differs from the functions shown in FIG. 9 is described. Assume that switch 225 is in an OFF state, and switch 260 is in an ON state. Assume that control device 10C controls power converter 20 in the isolated system mode.

Interconnected system determination unit 240 determines whether AC power system 101 has shifted from the isolated system to the interconnected system by adding a variation Δω0 in angular frequency to reference angular frequency ω0 for power converter 20 and varying the reference angular frequency ω0. The determination scheme employed by interconnected system determination unit 240 is now described in detail, with reference to FIGS. 20 to 23.

Figure 20A:
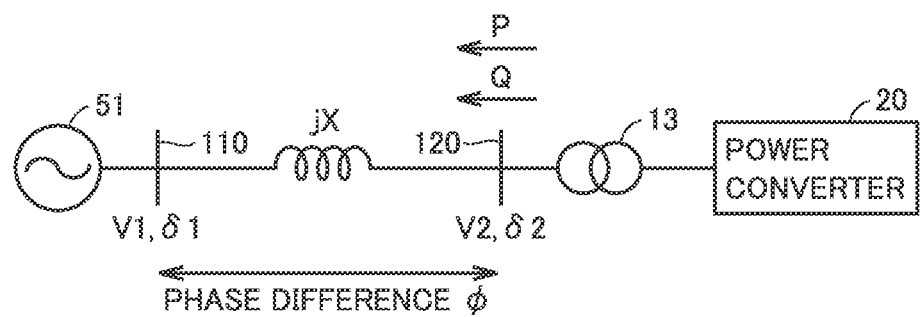
FIGS. 20(a) and 20(b) show model diagrams for illustrating determination schemes employed by the interconnected system determination unit.
Figure 20B:
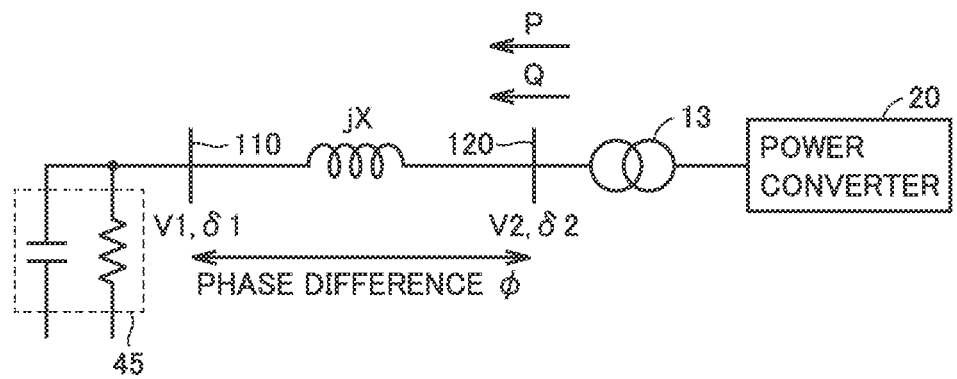

FIG. 20 shows model diagrams for illustrating the determination schemes employed by the interconnected system determination unit. Specifically, (a) of FIG. 20 is a model diagram when AC power system 101 is the interconnected system. Part (b) of FIG. 20 is a model diagram when AC power system 101 is the isolated system.

Referring to FIG. 20, a point of interconnection 110 is where AC power system 101 and generator 51 or a load 45 is connected to each other. In the case of (a) of FIG. 20, generator 51 is connected to point of interconnection 110, and thus AC power system 101 is the interconnected system. In the case of (b) of FIG. 20, load 45 is connected to point of interconnection 110, and thus AC power system 101 is the isolated system. The voltage at point of interconnection 110 is represented by V1.

Point of interconnection 120 is where AC power system 101 and power converter 20 are connected to each other. The voltage at point of interconnection 120 is represented by V2. The effective power and the reactive power at point of interconnection 120 are represent by P and Q, respectively. A phase difference φ is a phase difference between a phase δ1 of voltage V1 at point of interconnection 110 and a phase δ2 of voltage V2 at point of interconnection 120. The system impedance of AC power system 101 is represented by jx.

Figure 21:
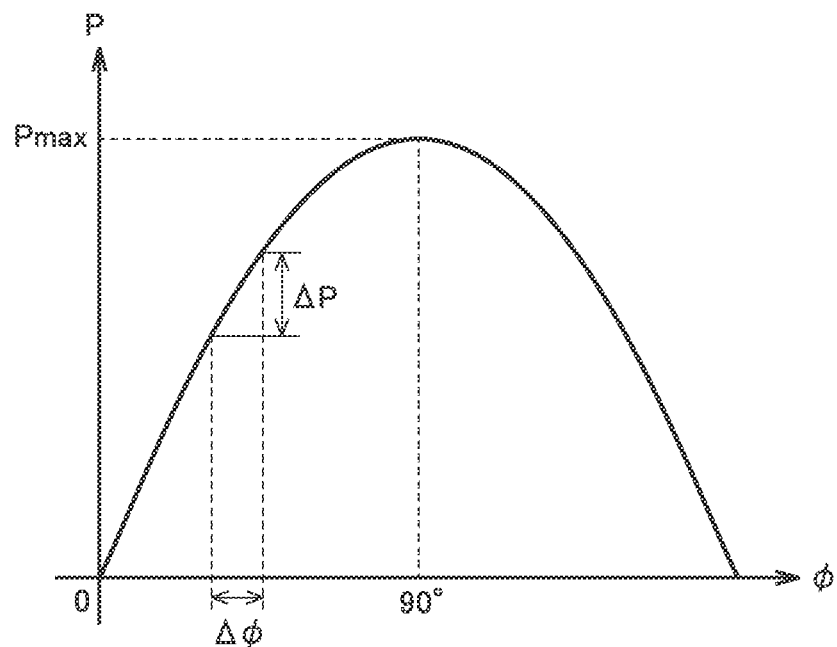
FIG. 21 is a diagram showing a phase difference versus an effective power.

FIG. 21 is a diagram showing phase difference φ versus effective power P. Referring to FIG. 21, phase difference φ changes parabolically, relative to effective power P. Effective power P reaches maximum Pmax when phase difference φ is 90 degrees. This is the same, irrespective of whether AC power system 101 is the isolated system or the interconnected system. Variation ΔP in effective power P is determined as a function of variation Δφ in phase difference φ. Effective power P is represented by Equation (1):

$$P = \{(V1 \times V2)/x\} \sin \varphi \qquad (1)$$

Accordingly, variation ΔP is represented by Equation (2):

$$\Delta P = \{(V1 \times V2)/x\} \cos \varphi \times \Delta \varphi \qquad (2)$$

Since generator 51 has inertia, phase δ1 of the voltage at point of interconnection 110 does not rapidly change even if reference angular frequency ω0 varies. In contrast, since load 45 has no inertia, phase δ1 of the voltage at point of interconnection 110 rapidly changes if reference angular frequency ω0 varies, with which the interconnected system determination unit 240 determines whether AC power system 101 has shifted from the isolated system to the interconnected system.

Figure 22:
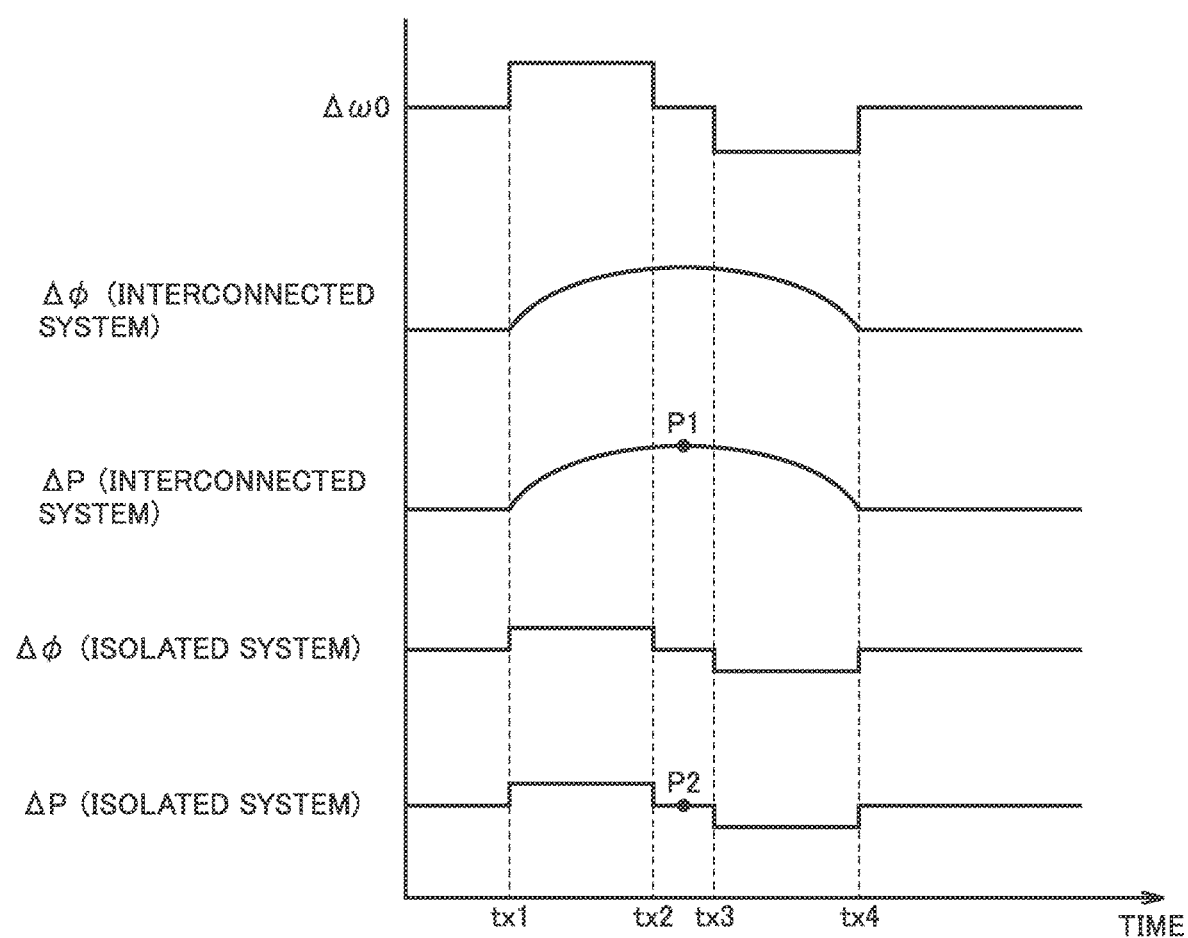
FIG. 22 is a timing chart for illustrating the determination schemes employed by the interconnected system determination unit.

FIG. 22 is a timing chart for illustrating the determination schemes employed by interconnected system determination unit 240. Referring to FIG. 22, interconnected system determination unit 240 injects a positive variation Δω0 for a period of time Tx from time tx1 to time tx2 to vary reference angular frequency ω0 in the positive direction, and stops varying the reference angular frequency ω0 by not injecting variation Δω0 for a period from time tx2 to time tx3.

Subsequently, interconnected system determination unit 240 injects a negative variation Δω0 for a period of time Tx from time tx3 to time tx4 to vary reference angular frequency ω0 in the negative direction. This restores reference angular frequency ω0 to a state before variation Δω0 is injected. Thus, overcurrent and step-out can be prevented from being generated.

When AC power system 101 is the interconnected system, as reference angular frequency ω0 is varied, phase δ2 at point of interconnection 120 changes in accordance with Equation: δ=∫ωdt. However, angular frequency ω and phase δ1 at point of interconnection 110 cannot change rapidly because of the inertia in generator 51 included in the interconnected system. Thus, variation Δφ in phase difference φ curvilinearly changes, following the changes in phase δ2. Therefore, variation ΔP in effective power P also changes curvilinearly.

In contrast, when AC power system 101 is the isolated system, there is no effects of the inertia in generator 51, and, as reference angular frequency ω0 is varied, phase δ1 at point of interconnection 110 can change rapidly. If the load connected to point of interconnection 110 has frequency characteristics, the amount of the load changes according to changes in angular frequency, which changes the amount of power flow. As a result, phase difference φ changes. In other words, variation Δφ in phase difference φ changes, following the variation Δω0. Therefore, variation ΔP in effective power P also changes, following the variation Δω0. Note that variation ΔP in the period from time tx1 to time tx2 is, generally, a frequency characteristics constant of load 45 multiplied by Δω0.

Interconnected system determination unit 240 varies reference angular frequency ω0 in the positive direction and suspends this varying for a period (i.e., the period from time tx2 to time tx3). In this period, value P1 of variation ΔP takes a value other than zero if AC power system 101 is the interconnected system. Value P1 is, generally, obtained by assigning variation Δω to variation Δφ in Equation (2). In contrast, in the period for which interconnected system determination unit 240 suspends varying the reference angular frequency ω0, value P2 of variation ΔP is, generally, zero if AC power system 101 is the isolated system.

Accordingly, interconnected system determination unit 240 can determine that AC power system 101 has shifted to the interconnected system if variation ΔP of effective power P is greater than or equal to a reference threshold Pth in the period during which interconnected system determination unit 240 suspends varying of the reference angular frequency ω0. Note that this determination can be made in a short time because the period between the frequency varying unit 242 starting and ending varying the reference angular frequency ω0 (i.e., the period from time tx1 to time tx4) is within several hundreds of ms.

Figure 23:
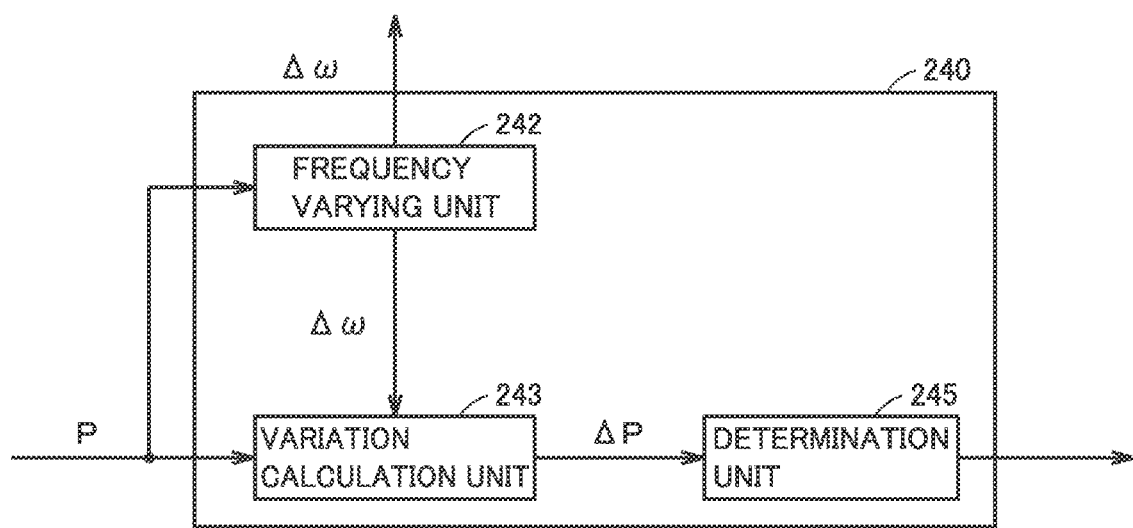
FIG. 23 is a diagram illustrating one example configuration of the interconnected system determination unit.

FIG. 23 is a diagram illustrating one example configuration of interconnected system determination unit 240. Referring to FIG. 23, interconnected system determination unit 240 includes a frequency varying unit 242, a variation calculation unit 243, and a determination unit 245. Here, assume that switch 225 is in an OFF state, and power converter 20 is controlled in the isolated system mode.

Frequency varying unit 242 varies a reference angular frequency ω for power converter 20 if effective power P at the point of interconnection between AC power system 101 and power converter 20 is outside the reference range. Specifically, frequency varying unit 242 inputs variation Δω0 to adder 241 if effective power P falls outside the reference range.

Typically, frequency varying unit 242 inputs variation Δω0 to adder 241, as described with respect to FIG. 22. Frequency varying unit 242 varies reference angular frequency ω0 in a first polarity direction (e.g., the positive direction) for a period of time Tx, and then stops varying the reference angular frequency ω0. Furthermore, after stopped varying the reference angular frequency ω0 in the first polarity direction, frequency varying unit 242 varies for a period of time Tx the reference angular frequency ω0 in a second polarity direction (e.g., the negative direction) opposite the first polarity direction. Adder 241 adds reference angular frequency ω0 and variation Δω0, and outputs the sum to adder-subtractor 223A. This varies the frequency of the voltage output from power converter 20.

After frequency varying unit 242 varies reference angular frequency ω0 in the first polarity direction for a period of time Tx, variation calculation unit 243 calculates variation ΔP in effective power P at the point of interconnection at a moment the frequency varying unit 242 stops varying the reference angular frequency ω0. Specifically, variation calculation unit 243 calculates variation ΔP in effective power P in a period from time tx2 to time tx3 of FIG. 22.

Based on variation ΔP in effective power P at the moment the frequency varying unit 242 stops varying the reference angular frequency ω0, determination unit 245 determines whether AC power system 101 has shifted from the isolated system to the interconnected system. Specifically, determination unit 245 determines that AC power system 101 has shifted from the isolated system to the interconnected system if variation ΔP is greater than or equal to the reference threshold Pth. Determination unit 245 determines that AC power system 101 is not shifted to the interconnected system (i.e., AC power system 101 is the isolated system) if variation ΔP is less than the reference threshold Pth.

If determined that AC power system 101 has shifted to the interconnected system, determination unit 245 outputs an ON signal to switch 225, and an OFF signal to switch 260. This brings switch 225 into an ON state and switch 260 into an OFF state. Thus, power converter 20 operates under the control scheme in the interconnected system mode.

Control device 10C may determine whether AC power system 101 has shifted to the interconnected system, while performing a frequency control in accordance with the frequency droop characteristics shown in FIG. 11. In this case, control device 10C determines whether AC power system 101 has shifted to the interconnected system, while adjusting the frequency as a function of the effective power output from power converter 20.

Alternatively, control device 10C may determine whether AC power system 101 has shifted to the interconnected system, while performing a frequency control in accordance with the non-linear frequency droop characteristics shown in FIG. 12. If AC power system 101 has shifted from the isolated system to the interconnected system, effective power P output from power converter 20 increases greater than expected, ending up falling outside the reference range. In this case, since droop value Dps follows droop characteristic 622, droop value Dps rapidly increases, and angular frequency ω rapidly decreases. This allows the frequency control following AC power system 101.

Therefore, the output from power converter 20 falls within an expected range, and generation of overcurrent can be inhibited. Accordingly, control device 10C can determines whether AC power system 101 has shifted from the isolated system to the interconnected system while continuing to operate by inhibiting the generation of overcurrent.

Note that in this case, control device 10C varies the reference angular frequency ω when effective power P falls outside the reference range (i.e., Pmin≤P<P2 or P1<P≤Pmax) because it is likely that AC power system 101 has shifted to the interconnected system if effective power P meets Pmin≤P<P2 or P1<P≤Pmax.

With the above configuration, control device 10C can accurately determine that AC power system 101 has shifted from the isolated system to the interconnected system. Moreover, by restoring the reference angular frequency ω0 to a state before variation Δω0 is injected, overcurrent and step-out can be prevented from being generated. This determination can also be made in a short time because the period between the frequency varying unit 242 starting and ending varying the reference angular frequency ω0 is within several hundreds of ms.

Other Embodiments (1) While the above embodiment has been described with reference to power converter 21 being connected to power converter 20 via DC transmission line 14, the present disclosure is not limited thereto. Specifically, instead of generator 63, transformer 61, AC power system 102, and power converter 21, a DC power supply that is capable of supplying a DC power may be connected to power converter 20.

Figure 24:
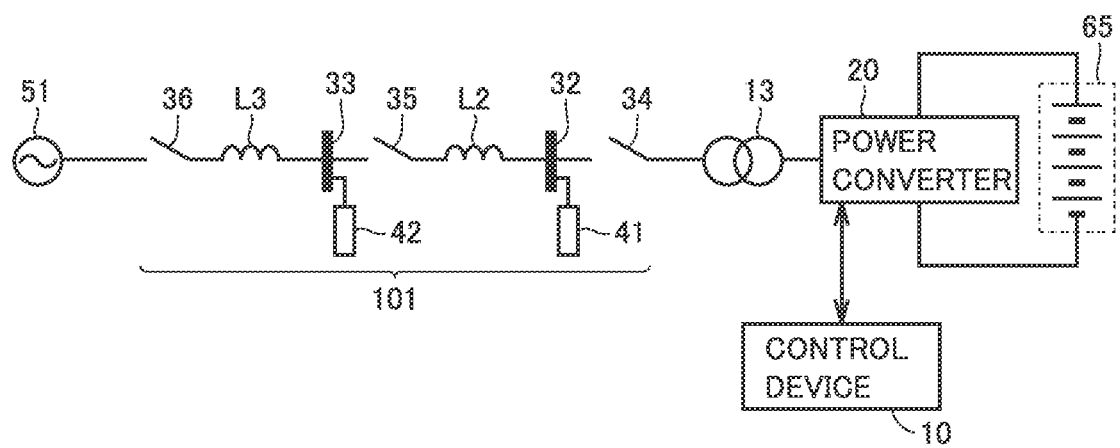
FIG. 24 is a diagram showing another example configuration of the power control system.

FIG. 24 is a diagram showing another example configuration of the power control system. Referring to FIG. 24, a DC power supply 65 is connected to power converter 20. DC power supply 65 is, for example, a storage battery, a photovoltaic device, a fuel cell, etc.

Figure 25:
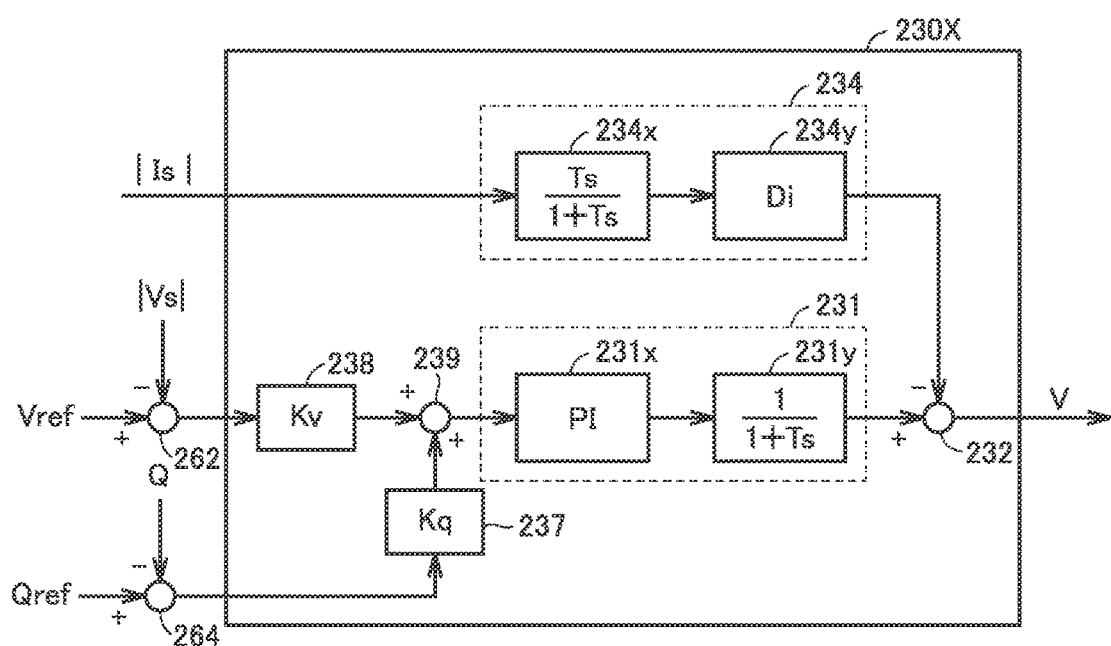
FIG. 25 is a diagram showing a variation of the configuration of the voltage control unit.

(2) The voltage control unit according to the embodiment, described above, is not limited to the above configuration, and may have a configuration as shown in FIG. 25, for example. FIG. 25 is a diagram showing a variation of the configuration of the voltage control unit. Referring to FIG. 25, a voltage control unit 230X corresponds to voltage control unit 230 of FIG. 7 having droop calculators 237 and 238, and an adder 239 added thereto. Control device 10 further includes an adder-subtractor 264.

Adder-subtractor 264 calculates a reactive power deviation ΔQr of a reactive power Q, which is calculated by reactive power calculation unit 207, from a reference reactive power Qref. Reactive power deviation ΔQr is output from adder-subtractor 264, and input to droop calculator 237 of voltage control unit 230X.

Droop calculator 237 computes a droop value as a function of reactive power deviation ΔQr, and outputs the droop value to adder 239. Specifically, droop calculator 237 computes droop value Dqr by multiplying reactive power deviation ΔQr by Kq, and outputs droop value Dqr to adder 239. Coefficient Kq indicates the slope of droop characteristics of droop calculator 237. Note that droop calculator 237 corresponds to droop calculator 235 shown in FIG. 9.

Droop calculator 238 computes a droop value as a function of voltage deviation ΔVr, and outputs the droop value to adder 239. Specifically, droop calculator 238 computes droop value Dvr by multiplying voltage deviation ΔVr by Kv, and outputs droop value Dvr to adder 239. Coefficient Kv indicates the slope of droop characteristics of droop calculator 238.

Adder 239 adds droop value Dqr and droop value Dvr, and outputs a sum Vqv of droop value Dqr and droop value Dvr to compensator 231. Compensator 231 subjects to a primary lag process a value obtained by compensating for sum Vqv, thereby calculating a compensation voltage value, and outputs the compensation voltage value to adder-subtractor 232. Specifically, PI controller 231x outputs to primary lag element 231y a value obtained by performing a feedback control so that sum Vqv is compensated for. Primary lag element 231y subjects an output value from PI controller 231x to a filtering process using the transfer function G1 to calculate a compensation voltage value, and outputs the compensation voltage value to adder-subtractor 232. Adder-subtractor 232 and droop calculator 234 are the same in configuration as those described with respect to FIG. 7.

With the above configuration, for example, when Kv=1 and Kq=0 are set, control device 10 causes power converter 20 to operate in a voltage-constant control scheme in which the output voltage of power converter 20 is controlled to be constant. When Kv=0 and Kq=1 are set, control device 10 causes power converter 20 to operate in a reactive power-constant control scheme in which the reactive power output of power converter 20 is controlled to be constant.

When Kv=1 and 0<Kq<1 are set, control device 10 causes power converter 20 to operate, while adjusting the output voltage as a function of the reactive power output of power converter 20. When 0<Kv<1 and Kq=1 are set, control device 10 causes power converter 20 to operate, while adjusting the reactive power output as a function of the output voltage of power converter 20. Coefficients Kq and Kv may be changed, as appropriate, by a system operator, or may be changed, as appropriate, depending on the system voltage of a power system.

(3) While the above-described embodiments are described with reference to power converters 20 and 21 being modular multilevel converters, the present disclosure is not limited thereto. For example, a circuit scheme of power converters 20 and 21 may be configured of a 2-level converter which converts AC power into two levels of DC power or a 3-level converter which converts AC power into three levels of DC power.

(4) The configuration exemplified as the above-described embodiment is one example configuration of the present disclosure, and can be combined with another known technique, or can be modified, such as part of the configuration being omitted, without departing from the gist of the present disclosure. Moreover, in the above-described embodiment, the processes and configurations described in the other embodiments may be appropriately adapted and implemented.

The presently disclosed embodiment should be considered in all aspects as illustrative and not restrictive. The scope of the present disclosure is indicated by the appended claims, rather than by the description above, and all changes that come within the scope of the claims and the meaning and range of equivalency of the claims are intended to be embraced within their scope.

REFERENCE SIGNS LIST 4u, 4v, 4w leg circuit; 5 upper arm; 6 lower arm; 7 sub-module; 8A, 8B reactor; 9A, 9B arm current detector; 10, 10A, 10B, 10C, 12 control device; 11A, 11B DC voltage detector; 13, 61 transformer; 14, 14N, 14P DC transmission line; 20, 21 power converter; 22A, 22B switching element; 23A, 23B diode; 24 DC capacitor; 25 converter circuit; 27 DC voltage detection unit; 28 transceiver; 29 gate control unit; 32, 33 busbar; 34, 35, 36 breaker; 41, 42, 45 load; 51, 63 generator; 55 auxiliary transformer; 56 signal converter unit; 65 DC power supply; 70 arithmetic processing unit; 71 bus; 72 CPU; 73 ROM; 74 RAM; 75 DI circuit; 76 DO circuit; 77 input interface; 78 communication interface; 81 AC voltage detector; 82 AC current detector; 101, 102 AC power system; 110, 120 point of interconnection; 201 voltage computation unit; 202 dq converter unit; 203 voltage calculation unit; 204 phase error calculation unit; 205 effective power calculation unit; 207 reactive power calculation unit; 209 current computation unit; 211 isolated system determination unit; 220, 220A, 220X, 220Y frequency control unit; 221, 221A, 221X phase generation unit; 222, 231 compensator; 224 integrator; 225, 225X, 260 switch; 226 adjuster circuit; 228, 234, 235, 237, 238 droop calculator; 230, 230A, 230X voltage control unit; 231x PI controller; 231y primary lag element; 234x imperfectly differentiating element; 234y droop coefficient element; 240, 272 interconnected system determination unit; 242 frequency varying unit; 243 variation calculation unit; 245 determination unit; 250, 250B command unit; 270 overcurrent detection unit; 301 voltage determination circuit; 302, 303 phase determination circuit; 304 rate-of-change determination circuit; 305 OR circuit; and 306 AND circuit.

The invention claimed is:

1. A control device for controlling a self-excited power converter connected to an alternating-current (AC) power system, the control device comprising:
 a phase generation unit to generate a phase of a voltage command for the power converter;
 a voltage control unit to generate a voltage value of the voltage command; and
 a command unit to output the voltage command having the phase and the voltage value to the power converter, wherein
 the voltage control unit includes:
 a voltage compensator unit to compute a compensation voltage value, based on a voltage deviation of a point-of-interconnection voltage at a point of interconnection between the AC power system and the power converter from a reference voltage;
 a droop calculator unit to receive an absolute value of a point-of-interconnection current flowing through the point of interconnection and compute a first droop value in accordance with the absolute value of the point-of-interconnection current flowing, when the AC power system is an isolated system, the isolated system being the AC power system not connected to a generator; and a calculation unit to calculate the voltage value of the voltage command, based on a difference between the compensation voltage value and the first droop value.

2. The control device according to claim 1, wherein the voltage compensator unit computes the compensation voltage value by subjecting a value compensating for the voltage deviation to a primary lag process, and the droop calculator unit computes the first droop value by subjecting an absolute value of the point-of-interconnection current to an imperfectly differentiating process, and multiplying the absolute value by a first coefficient.

3. The control device according to claim 1, wherein the voltage compensator computes the compensation voltage value, based on a value obtained by subtracting a second droop value from the voltage deviation, wherein the second droop value is obtained by multiplying a reactive power at the point of interconnection by a second coefficient.

4. The control device according to claim 1, wherein when the AC power system is the isolated system, the phase generation unit generates the phase of the voltage command by time-integrating a reference angular frequency.

5. The control device according to claim 1, wherein when the AC power system is the isolated system, the phase generation unit generates the phase of the voltage command by subtracting a third droop value from a reference angular frequency and time-integrating a value obtained by subtracting the third droop value from the reference angular frequency, the third droop value being obtained by multiplying an effective power at the point of interconnection by a third coefficient.

6. The control device according to claim 5, wherein the third coefficient indicates a slope of a frequency droop characteristic, and the frequency droop characteristic is a non-linear droop characteristic having a first droop characteristic when the effective power at the point of interconnection is within a reference range, and a second droop characteristic when the effective power at the point of interconnection is outside the reference range, and a slope of the second droop characteristic is greater than a slope of the first droop characteristic.

7. The control device according to claim 1, further comprising a phase error calculation unit to calculate a phase error between the phase of the voltage command for the power converter and a phase of the point-of-interconnection voltage, wherein the phase generation unit:

computes a compensating angular frequency compensating for the phase error;

gradually reduces the compensating angular frequency after the AC power system has shifted to the isolated system; and generates the phase of the voltage command by time-integrating a sum of the compensating angular frequency and a reference angular frequency for the power converter.

8. The control device according to claim 1, further comprising a phase error calculation unit to calculate a phase error between the phase of the voltage command for the power converter and a phase of the point-of-interconnection voltage, wherein the phase generation unit:

computes a compensating angular frequency compensating for the phase error;

gradually reduces the compensating angular frequency after the AC power system has shifted to the isolated system;

calculates a difference between the compensating angular frequency and a third droop value, the third droop value being obtained by multiplying an effective power at the point of interconnection by a third coefficient; and generates the phase of the voltage command by time-integrating a sum of a reference angular frequency for the power converter and the difference between the compensating angular frequency and the third droop value.

9. The control device according to claim 1, wherein the power converter converts an electric power between the AC power system and a direct-current (DC) power system.

10. The control device according to claim 1, wherein the power converter includes a first arm and a second arm, the first arm and the second arm each include a plurality of sub-modules connected in series, and each sub-module has a switching element, a diode, and a capacitor, the diode and the capacitor being connected in parallel with the switching element.

11. The control device according to claim 2, wherein the voltage compensator unit computes the compensation voltage value, based on a value obtained by subtracting a second droop value from the voltage deviation, wherein the second droop value is obtained by multiplying a reactive power at the point of interconnection by a second coefficient.

12. The control device according to claim 2, wherein when the AC power system is the isolated system, the phase generation unit generates the phase of the voltage command by time-integrating a reference angular frequency.

13. The control device according to claim 3, wherein when the AC power system is the isolated system, the phase generation unit generates the phase of the voltage command by time-integrating a reference angular frequency.

14. The control device according to claim 2, wherein when the AC power system is the isolated system, the phase generation unit generates the phase of the voltage command by subtracting a third droop value from a reference angular frequency and time-integrating a value obtained by subtracting the third droop value from the reference angular frequency, the third droop value being obtained by multiplying an effective power at the point of interconnection by a third coefficient.

15. The control device according to claim 3, wherein when the AC power system is the isolated system, the phase generation unit generates the phase of the voltage command by subtracting a third droop value from a reference angular frequency and time-integrating a value obtained by subtracting the third droop value from the reference angular frequency, the third droop value being obtained by multiplying an effective power at the point of interconnection by a third coefficient.

16. A power conversion device comprising:
a self-excited power converter connected to an alternating-current (AC) power system; and
a control device for controlling the self-excited power converter,
wherein the control device includes:
a phase generation unit to generate a phase of a voltage command for the power converter;
a voltage control unit to generate a voltage value of the voltage command; and
a command unit to output the voltage command having the phase and the voltage value to the power converter, wherein
the voltage control unit includes:
a voltage compensator unit to compute a compensation voltage value, based on a voltage deviation of a point-of-interconnection voltage at a point of interconnection between the AC power system and the power converter from a reference voltage;
a droop calculator unit to receive an absolute value of a point-of-interconnection current flowing through the point of interconnection and compute a first droop value in accordance with the absolute value of the point-of-interconnection current flowing, when the AC power system is an isolated system, the isolated system being the AC power system not connected to a generator; and
a calculation unit to calculate the voltage value of the voltage command, based on a difference between the compensation voltage value and the first droop value.

* * * * *